United States Patent [19]
Shido et al.

[11] Patent Number: 5,230,057
[45] Date of Patent: Jul. 20, 1993

[54] SIMD SYSTEM HAVING LOGIC UNITS ARRANGED IN STAGES OF TREE STRUCTURE AND OPERATION OF STAGES CONTROLLED THROUGH RESPECTIVE CONTROL REGISTERS

[75] Inventors: Tatsuya Shido, Kawasaki; Kaoru Kawamura; Masanobu Umeda, both of Yokohama; Toshiyuki Shibuya, Inagi; Hideki Miwatari, Yokohama, all of Japan

[73] Assignee: Fujitsu Limited, Kawasaki, Japan

[21] Appl. No.: 409,613

[22] Filed: Sep. 19, 1989

[30] Foreign Application Priority Data

Sep. 19, 1988 [JP] Japan .............................. 63-234545
Sep. 19, 1988 [JP] Japan .............................. 63-234546

[51] Int. Cl.$^5$ .............................................. G06F 15/80
[52] U.S. Cl. ...................................... 395/800; 395/775;
364/231.9; 364/229.41; 364/258; 364/DIG. 1;
364/736
[58] Field of Search ............... 395/325, 575, 725, 800,
395/775; 364/736, 741

[56] References Cited

U.S. PATENT DOCUMENTS

| | | | |
|---|---|---|---|
| 4,304,002 | 12/1981 | Hunt | 371/49 |
| 4,541,048 | 9/1985 | Propster et al. | 395/725 |
| 4,574,345 | 3/1986 | Konesky | 395/325 |
| 4,621,339 | 11/1986 | Wagner et al. | 395/800 |
| 4,775,952 | 10/1988 | Danielsson et al. | 364/736 |
| 4,876,641 | 10/1989 | Cowley | 395/800 |
| 4,888,721 | 12/1989 | Kondoh et al. | 364/736 |
| 4,905,143 | 2/1990 | Takahashi et al. | 395/800 |
| 4,908,751 | 3/1990 | Smith | 395/800 |
| 4,922,418 | 5/1990 | Dolecek | 395/575 |
| 4,939,642 | 7/1990 | Blank | 395/800 |
| 5,088,048 | 2/1992 | Dixon et al. | 395/11 |
| 5,129,092 | 7/1992 | Wilson | 395/800 |

FOREIGN PATENT DOCUMENTS 0131658 1/1985 European Pat. Off. .
0236762 9/1987 European Pat. Off. .

OTHER PUBLICATIONS

"Mini-Micro Conference Record" Aug.-Nov. 11, 1983, pp. 1-8, C. E. McDowell.
"Architecture and Applications of the Connection Machine", 1988, by Lewis W. Tucker and George G. Robertson.
European Search Report conducted at The Hague by Examiner Blionas S. and completed Oct. 31, 1990.

Primary Examiner—Thomas C. Lee
Assistant Examiner—Alpesh M. Shah
Attorney, Agent, or Firm—Staas & Halsey

[57] ABSTRACT

In a parallel computer system using a SIMD method constituted by a controller and a plurality of processor elements, each of the processor elements has a storage unit to store data to be processed, the controller controls operation of the processor elements, and the parallel computer system performs processing of the data based on a calculation control signal transmitted from the controller. The parallel computer system further a data collection unit connected between the processor elements and the controller for receiving output data from the processor elements, performing a predetermined calculation, and outputting calculated data to the controller; and a calculation control unit connected between the data collection unit and the controller for transmitting the calculation control signal from the controller to the data calculation unit to make it possible to perform the predetermined calculation in the data collection circuit.

7 Claims, 25 Drawing Sheets

Fig. 5

| | SIGNAL NAME | bit | ATTRIBUTE | CONTENTS |
|---|---|---|---|---|
| DATA | GLI | 32 | I | GLU INPUT DATA |
| | GLO | 1 | O | GLU OUTPUT DATA |
| | TOTAL | 33 | | |
| CONTROL | XGOPS | 2 | I | GLU OPERATION CODE (00:AND, 01:OR, 10:MIN/MAX, 11:ADD) |
| | XGCR | 1 | I | CARRY CLEAR (0:CARRY CLEAR, 1:NORMAL) |
| | GLSTS | 2 | I | GLU INPUT STAGE SW (00:32, 01:16, 10:8, 11:4) |
| | GMAXS | 1 | I | MIN, MAX SELECTION SIGNAL (0:MAX, 1:MIN) |
| | GNOPS | 1 | I | "0" FORCELY INPUT SIGNAL (0:"0" INPUT, 1:NORMAL) |
| | TOTAL | 7 | | |

TOTAL 40 bits

WINDOW NUMBER

| aaaa | 0000 |  (BASE ADDRESS)

+

VIRTUAL PE ADDRESS (RELATIVE ADDRESS)

| 0000 | bbbbbbbbbbbb |

‖

⎯ 16 BITS ⎯

REAL ADDRESS

| aaaabbbbbbbbbbbb |

Fig. 22

| REGISTRATION OUTPUT | CONSECUTIVENESS OUTPUT | EVENT OUTPUT | SELF-EVENT | REGISTRATION | ADDRESS HOLDING |
|---|---|---|---|---|---|
| \<-- INPUT --\> | | | | \<-- OUTPUT --\> | |
| F | F | F | F | F | F |
| T | F | F | F | F | F |
| F | T | F | F | F | F |
| T | T | F | F | | |
| F | F | (T) | F | (T) | F |
| T | F | T | F | F | F |
| F | (T) | (T) | F | F | (T) |
| T | T | T | F | | |
| — | — | — | (T) | F | (T) |

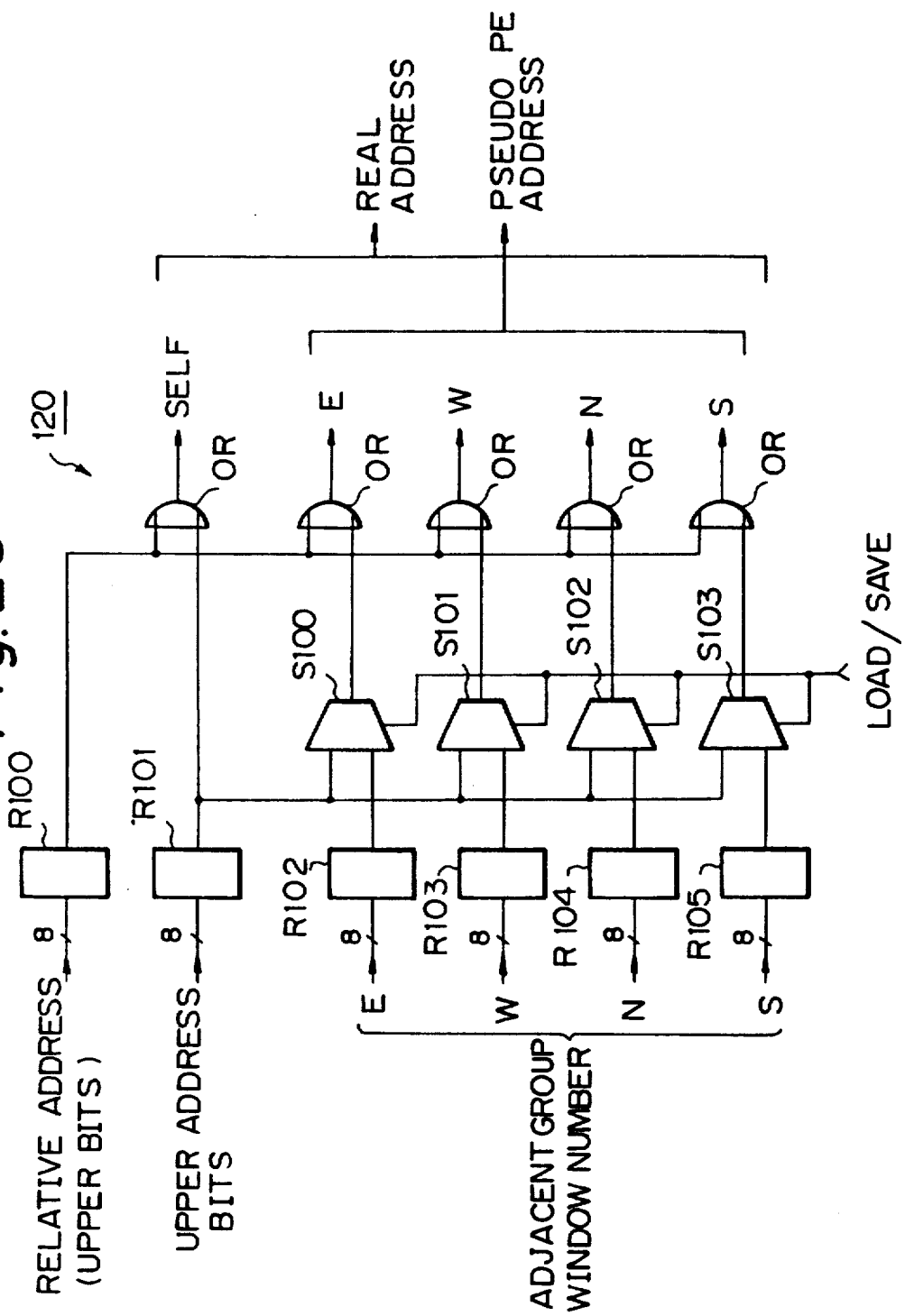

SIMD SYSTEM HAVING LOGIC UNITS ARRANGED IN STAGES OF TREE STRUCTURE AND OPERATION OF STAGES CONTROLLED THROUGH RESPECTIVE CONTROL REGISTERS

BACKGROUND OF THE INVENTION

1. Field of the Invention

The present invention relates to a parallel computer system using a SIMD method constituted by a controller and a plurality of processor elements connected to each other in a lattice configuration.

2. Description of the Related Art

Parallel computer systems are widely used, particularly, in the field of CAD (Computer Aided Design) which necessitates high speed calculation for a LSI (large scale integrated) circuit design. Accordingly, it is desirable to improve techniques to make these processor elements operate more efficiently in order to meet the with requirements of high density and high speed LSI.

There are two types of parallel computers based on the connection configuration between the processor elements and the controller. One method is called an MIMD (multiple instruction stream multiple data stream) method which is constituted by a plurality of processor elements and controllers. In this method, each of the processor elements is connected to a corresponding controller, respectively. Accordingly, it is necessary to provide the same number of controllers as there are processors. However, it is difficult to constitute a large scale parallel computer system using this method because a large number of controllers are necessary in accordance with the number of processors, which can be from several tens to several hundreds of processors.

The other method is called an SIMD (single instruction stream multiple data stream) method which is constituted by a plurality of processor elements and one controller. In this method, the controller is connected in parallel to all processor elements. Accordingly, it is possible to constitute a large scale parallel computer which has a large number of processor elements, for example, several tens of thousands of processors. For example, a "Connection Machine" made by Thinking Machines Corporation uses the SIMD method. This system is constituted by several tens of thousands of processor elements.

There problems several associated with the SIMD type of parallel computer.

A first problem occurs in the synchronization of all the processor elements. In general, two countermeasures are taken for solving this problem. In the first countermeasure, data for obtaining synchronization is exchanged between processor elements through a transmission line. However, it is necessary for all the effectively apply this method. In the second countermeausre a particular signal for obtaining synchronization is output from each processor element. Then, "wired-OR" logic is performed on all of the synchronization signals and the resultant data of the wired-OR is returned to all of the processor elements. However, the number of processor elements is limited in the wired-OR logic approach because a large delay occurs in the wired-OR logic operation.

A second problem occurs in the order of priority use of the bus line. When the number of processor elements reaches from several thousand to several tens of thousands, it is necessary to determined the priority order of use of the bus line.

A third problem occurs in the extraction of essential data from essential processor elements. The essential data is, for example, maximum data or minimum data.

One type of parallel computer system according to the present invention is provided for the solution of the above problems.

The other type of the parallel computer system according to the present invention can control all processor elements so as to effectively and uniformly distribute the processor elements as a load.

SUMMARY OF THE INVENTION

The object of the present invention is to, provide a parallel computer system using a SIMD method and enabling high efficiency data processing and high load distribution capability.

In accordance with the present invention, there is provided a parallel computer system using a SIMD method constituted by a controller and a plurality of processor elements, each of the processor elements having a storage unit to store data to be processed, the controller controls the operation of the processor elements, and the parallel computer system processes data based on a calculation control signal transmitted from the controller, the parallel computer system comprising: a data collection unit connected between the processor elements and the controller for receiving data output from the processor elements, performing a predetermined calculation, and outputting calculated data to the controller; and a calculation control unit connected between the data collection unit and the controller for transmitting the calculation control signal from the controller to the data calculation unit to make it possible to perform the predetermined calculation in the data collection circuit.

Further, in accordance with the present invention, there is provided a parallel computer system using a SIMD method constituted by a controller and a plurality of processor elements, each of the processor elements having a storage unit to store data to be processed, the controller controls operation of the processor elements, and the parallel computer system performs processing of data based on a calculation control signal transmitted from the controller, the parallel computer system comprising: a plurality of control groups, each control group being constituted by a number of processor elements divided from a plurality of processor elements, to be utilized as an address control unit; a plurality of scheduling circuits, with a scheduling circuit being provided for each control group and operatively connected to the controller, for receiving and managing an event signal designating an address signal for data to be processed and transmitted from an adjacent control group; and a plurality of real address generation circuits with a real address generation circuit provided for each control group and operatively connected to the controller, the scheduling circuit and the control group, for generating an address signal for data to be processed by a processor element belonging to the control group based on a base address determined by the event signal to be managed by the scheduling circuit and an address signal applied from the controller.

BRIEF DESCRIPTION OF THE DRAWINGS

In the drawings:

FIG. 5 is a table for explaining various control signals shown in FIG. 4;

FIG. 22 is a logic table in the event interpretation circuit shown in FIG. 18;

FIG. 26 is a detailed a block diagram of the real address generation circuit shown in FIG. 18.

DESCRIPTION OF THE PREFERRED EMBODIMENTS

Figure 1:
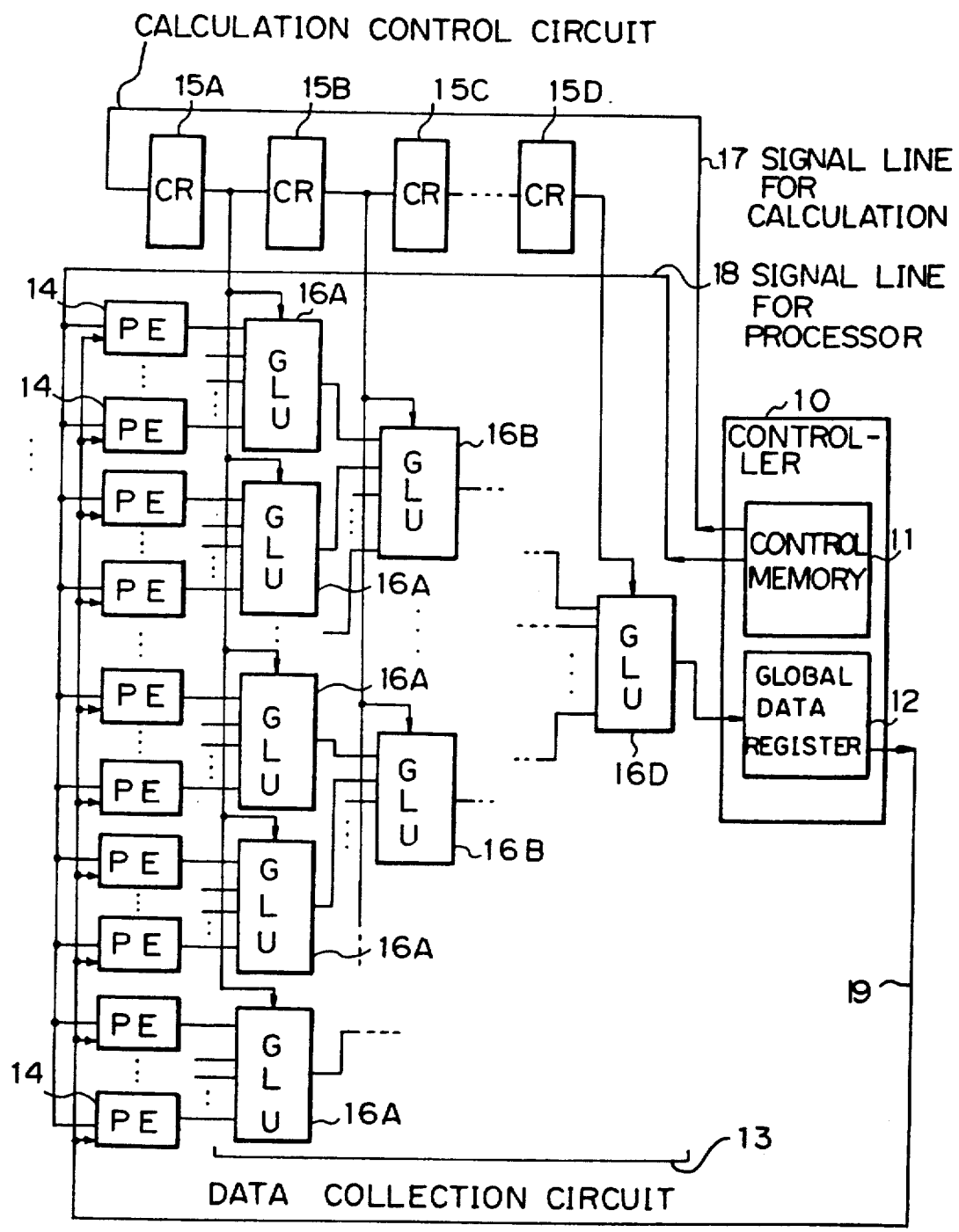
FIG. 1 is a basic block diagram of one type of parallel computer system according to the present invention.

FIG. 1 is a basic block diagram of one type of a parallel computer system according to the present invention. In FIG. 1, reference number 10 denotes a controller, 11 a control memory for storing a micro-code including output control signals, and 12 a global data register for performing an input/output operation of the data processed or to be processed. The control memory 11 and the global data register 12 are provided in the controller 10. Reference number 13 denotes a data collection circuit for collecting output data from processor elements (PE) 14. 15A to 15D denote control registers CR constituting a calculation control circuit and connected to each other using a pipe-line method for applying various calculation control signals to the collection circuit 13. 16A to 16D denote gathering logic units (GLU) constituting the data collection circuit 13 and each constituted by a tree configuration. Reference number 17 denotes a signal line for the calculation control signal to the GLU, 18 a signal line for controlling processor elements, and 19 a data line for broadcasting global data.

Figure 3:
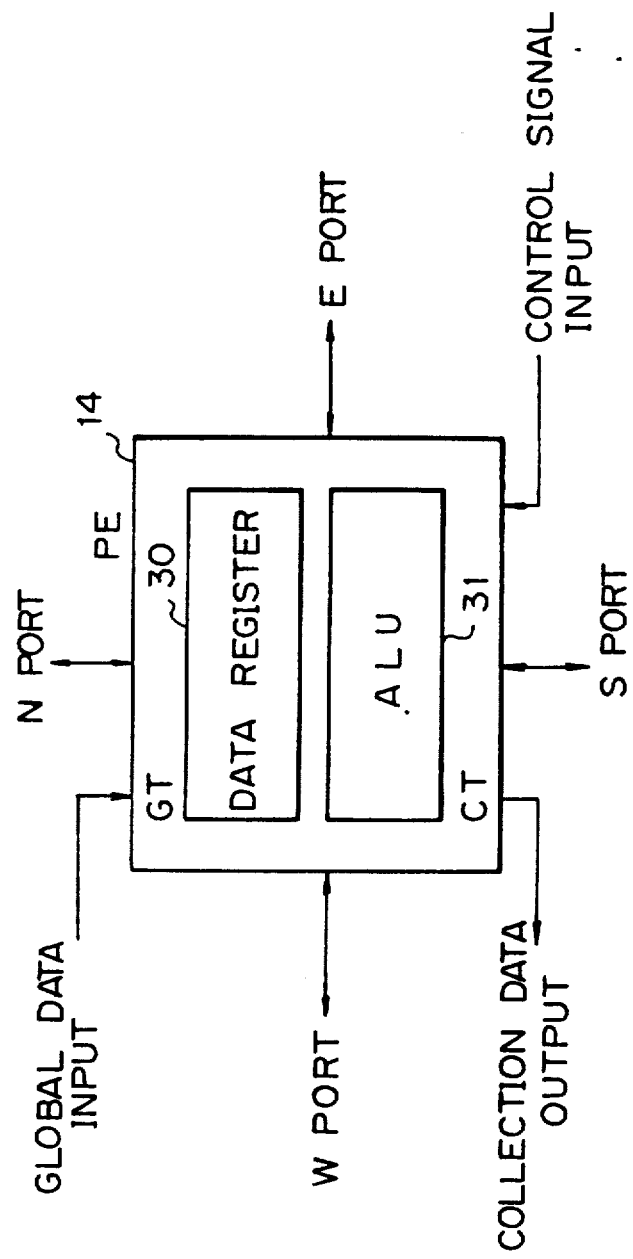
FIG. 3 is a schematic block diagram of a processor element shown in FIGS. 1 and 2.

Each of the processor elements comprises a data register for storing the data to be processed and an arithmetic logic unit (ALU) as shown in FIG. 3. The arithmetic logic unit ALU calculates the data stored in the register in response to the order transmitted from the controller 10 through the signal line 18.

Each gathering logic unit GLU 16A to 16D collects the output data transmitted from the processor elements. The gathering logic units 16A to 16D are connected in the form of a tree configuration having several stages. That is, in FIG. 1, the units 16A are the first stage, the units 16B are the second stage, and the unit 16D is the final stage. The outputs of the processor elements 14 are input to the gathering logic units 16A. The resultant calculation data obtained in the GLU's 16A are output to the GLU's 16B. Similarly, the resultant data obtained in the GLU's 16B are output to the next stage. The final stage 16D gathers all resultant data obtained in the previous stages and the data calculated in the final stage 16D is output to the global data register 12 in the controller 10.

Each of the calculation control registers CR 15A to 15D are connected in series with each other using the pipe-line method. The number of registers is equal to the number of stages in the gathering logic unit GLU. In this case, the calculation in each stage is performed in response to the calculation control signals, for example, an "ADD" calculation signal, transmitted through the signal line 17. That is, when the calculation signal "ADD" is input to the first stage 16A, the calculation suggested by the calculation signal is performed in the first stage 16A regarding the data output from the processor elements. This calculation signal is transmitted to the next stage in response to the clock signal from the controller 10 and the same calculation suggested by the calculation signal is performed in the second stage 16B. The above calculation is performed using the pipe-line method. That is, when the-first calculation signal "ADD" is input to the second stage, the next calculation signal, for example, "MAX" is input to the first stage.

The synchronization of all processor elements is performed in accordance with a synchronization signal from the controller 10. The controller 10 sends the synchronization signal to all processor elements through the control line 18 to output the value "1" when each processor element completes the predetermined processing. At the same time, the signal "AND" is transmitted to the control register 15A through the control line 17.

When the calculation signal "AND" is set in the register 15A, the GLU 16A of the first stage performs an "AND" calculation regarding all outputs from the processor elements in response to the first clock. The same "AND" calculation is performed in the GLU 16B of the next stage in response to the next clock. When the same "AND" calculation is performed in the GLU 16D of the final stage in response to the clock and the resultant data is the value "1", the controller 10 can recognize that all processor elements output the value "1".

The essential processor element having the essential data is extracted as follows. A proper processor number is previously attached to each processor element. First, the controller 10 commands the essential processor element to output the proper number. Second, the controller 10 commands another processor element to output a suitable signal, for example, the value "11—1" or "00—0". The controller 10 then sends the control signal "MAX" or "MIN" to the control register 15A. Accordingly, the essential processor element can be selected in response to "MAX" or "MIN" of the number in the collection circuit 13. In this case, a next essential processor element can be selected from the remaining processor elements excluding the first essential processor element in the same manner as the above. Accordingly, it is possible to use this circuit to select the priority order of use of a bus line.

Figure 2:
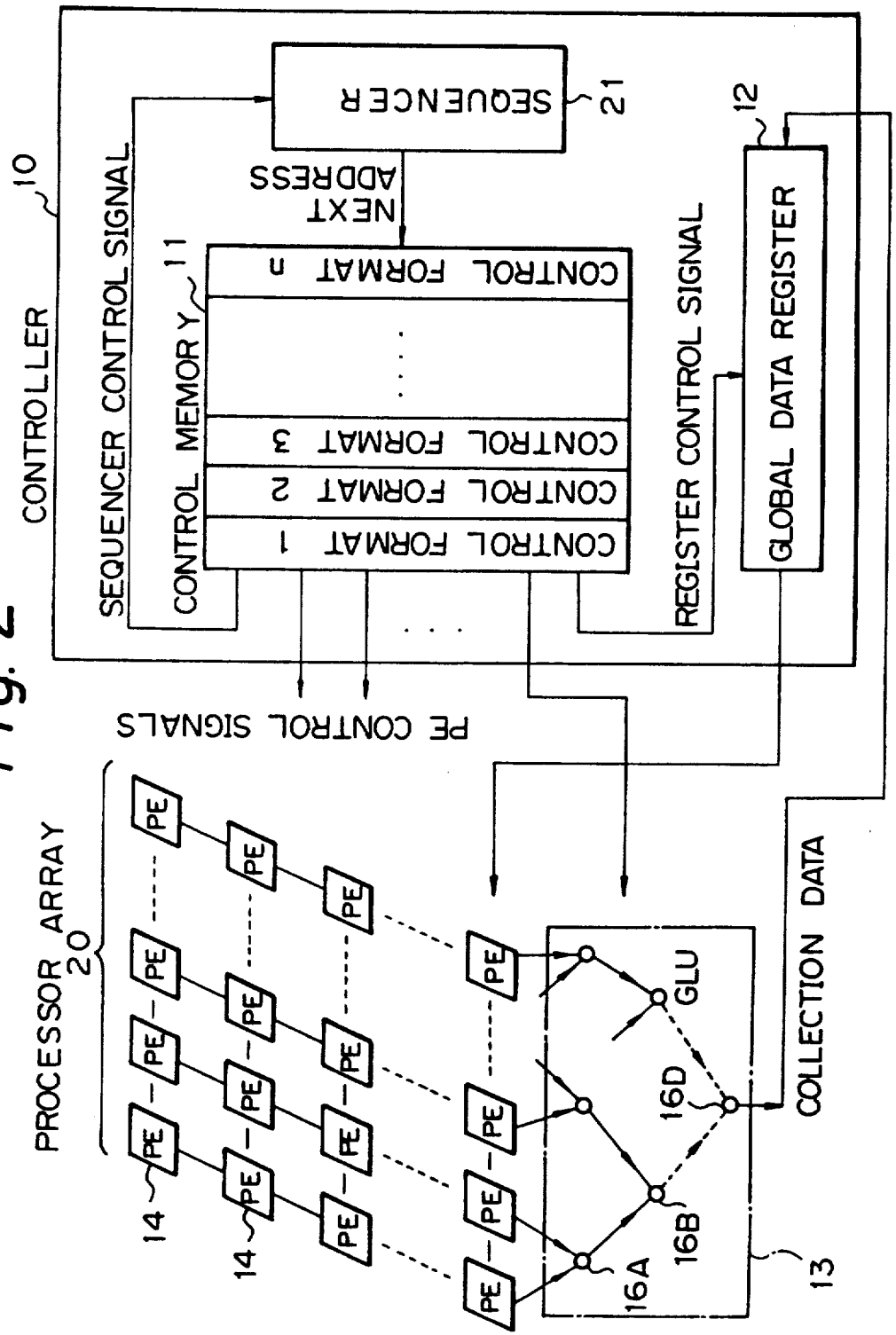
FIG. 2 is a block diagram of one embodiment of a parallel computer system shown in FIG. 1.

FIG. 2 is one embodiment of a parallel computer system shown in FIG. 1. The same reference numbers as used previous indicate the same components. In FIG. 2, reference number 20 denotes a processor array the elements of which are connected to each other in a lattice configuration. As explained above, the processor array and the collection circuit are controlled by the control signals from the controller 10. The control memory 11 in the controller 10 comprises a plurality of control formats 1 to n.

The controller 10 further comprises a sequencer 21 which determines the sequence for reading out the control information from the control memory 11. The global data register 12 is a register for holding the data transmitted in common to all processor elements and to receive the output data from the collection circuit 13.

FIG. 3 is a schematic block of a processor element. In FIG. 3, reference number 30 denotes a data register for holding the data to be processed. Reference number denotes an arithmetic logic unit ALU for performing calculations using the data stored in the data register 30. The processor element 14 is controlled by the same control signal transmitted from the controller 10. This control signal includes an address of the data register 30 and an operation code for the arithmetic logic unit 31. The processor element 14 further comprises four ports, i.e., east port (E), west port (W), north port (N) and south port (S) for communicating between adjacent processor elements. The processor element 14 further comprises an input terminal GT for inputting the data from the global data register 12, and a collection terminal CT for outputting the data.

The processor element 14 is a one-bit type and the input/output operation to the data register 30 is basically performed for each bit. Data larger than one bit is processed from the most significant bit (MSB) or the least significant bit (LSB) for each bit.

Figure 4:
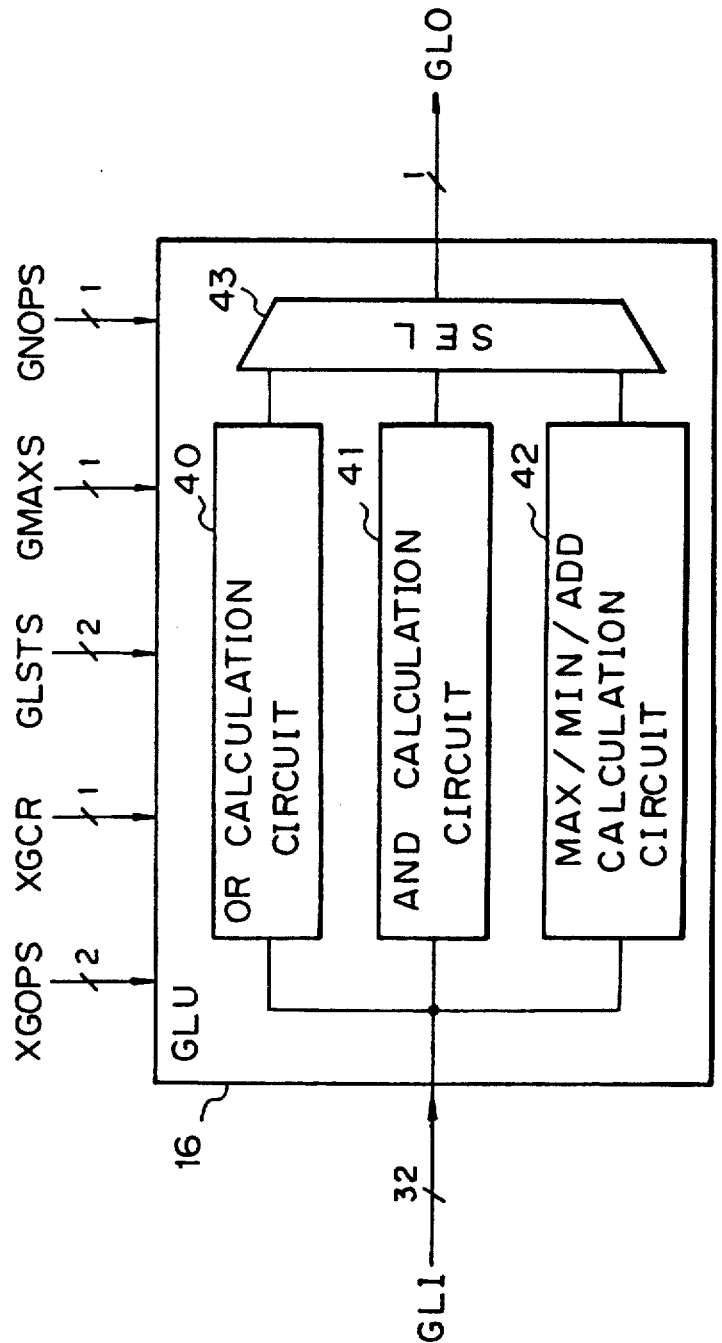
FIG. 4 is a schematic block diagram of a gathering logic unit GLU shown in FIG. 1.

FIG. 4 is a schematic block diagram of a gathering logic unit GLU. Each of the gathering logic units GLU 16A to 16D comprises an OR calculation circuit 40, an AND calculation circuit 41, a MAX/MIN/ADD calculation circuit 42 and a selector circuit SEL 43. The signal GLI is data input to the GLU 16 and constituted by 32 bits. This means that one GLU 16 can handle a maximum of 32 bits in the input side. The signal GLO is resultant data and is constituted by one bit.

Kinds of calculation control signals input to the GLU 16 from the control registers 15A to 15D are as follows. These control signals are shown in a table in FIG. 5.

XGOPS (2 bits)

This is an operation code for the GLU 16. When this signal is the value "00", the AND calculation is performed, when it is "01", the OR calculation is performed, when it is "10", the "MIN" or "MAX" calculation is performed, and when it is "11", the "ADD" calculation is performed.

XGCR (1 bit)

This is a carry control signal for a carry clear operation in the "ADD" calculation.

GLSTS (2 bits)

This is a switching signal for switching the number of bits of the input signal to the GLU. That is, the number of bits of the input signal, for example, 32 bits, 16 bits, 8 bits, or 4 bits can be selected by this switching signal.

GMAXS (1 bit)

This is an instruction signal to select either a "MIN" or "MAX" calculation when the operation order XGOPS is the value "10".

GNOPS (1 bit)

This is an instruction signal to force the input signal to "0". When this bit is "0", the input data GLI becomes invalid.

Figure 6:
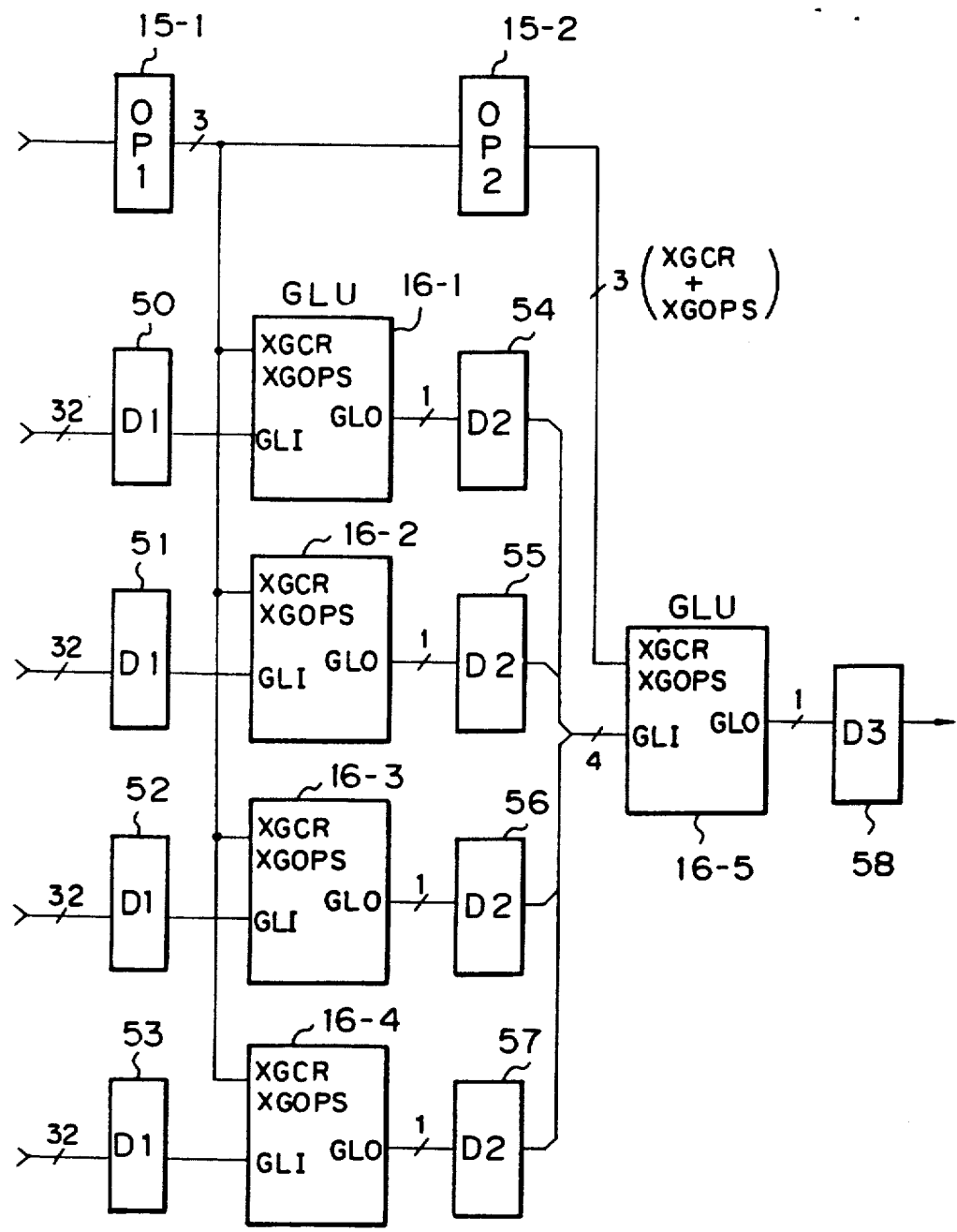
FIG. 6 shows one example of a data collection circuit having gathering logic units shown in FIG. 1.

FIG. 6 shows one example of a data collection circuit having gathering logic units GLU. As is obvious from the drawing, the first stage is constituted by four GLU's 16-1 to 16-4, and the second stage (final stage) is constituted by one GLU 16-5. Since each GLU can handle 32 bits in the input side, this circuit can handle up to 128 bits in the input side.

The operation code XGOPS and the carry control signal XGCR are used in the registers 15-1 and 15-2 to simplify the explanation. Accordingly, the GLU performs the calculation under the above operation code and the carry control signal. Further, reference numbers 50 to denote registers for the pipe-line control. OP-1 denotes a signal set in the register 15-1, and OP-2 denotes a signal set in the register 15-2. Further, D1 denotes data set in the registers 50 to 53, D2 data set in the registers 54 to 57, and D3 data set in the register 58.

Figure 7:
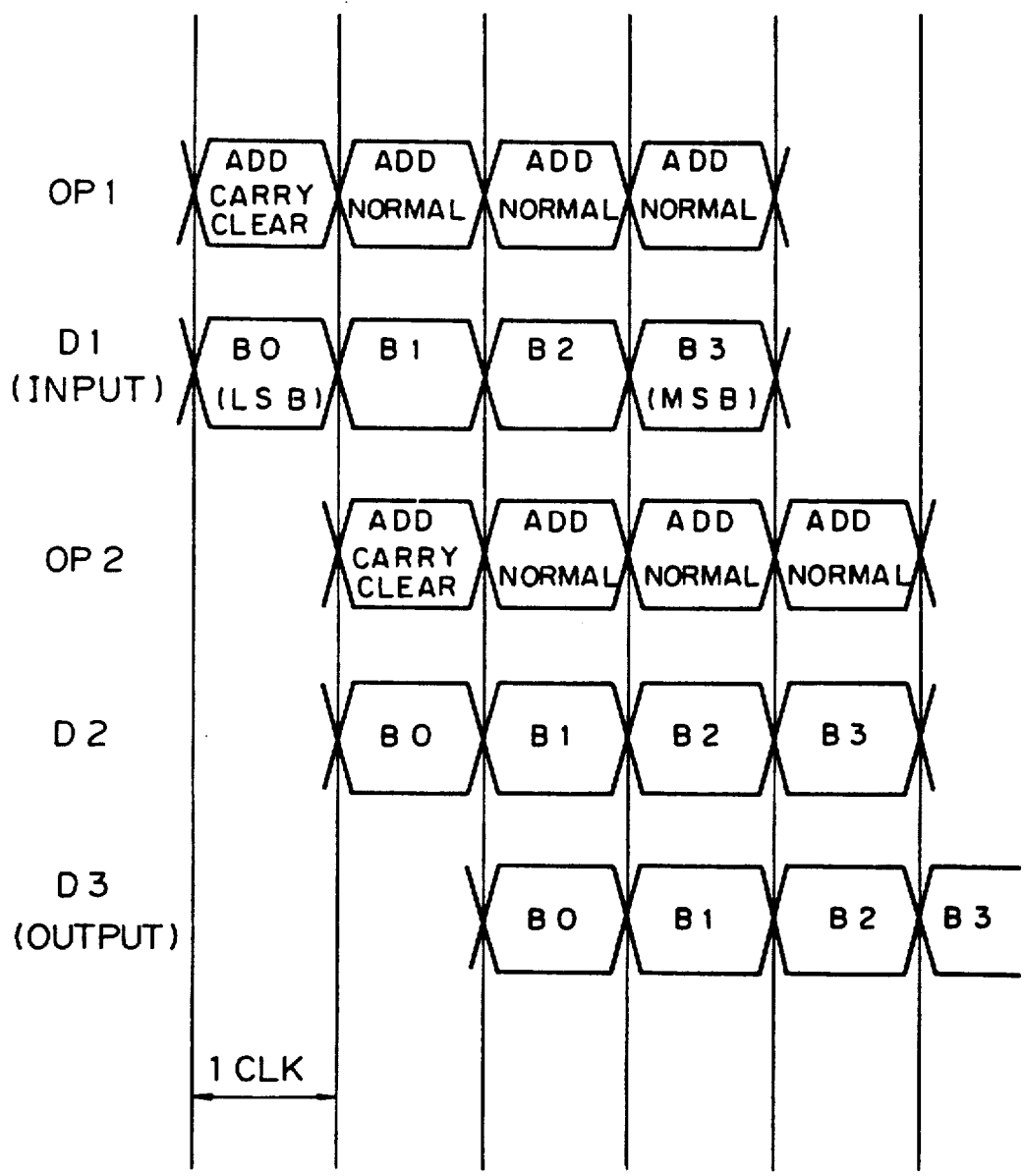
FIG. 7 is a signal timing chart for explaining the operation of the circuit shown in FIG. 6.

FIG. 7 is a signal timing chart for explaining the operation of the circuit shown in FIG. 6. In FIG. 7, B0 to B3 denote four-bit data to be processed, B0 is a least significant bit (LSB) and B3 is a most significant bit (MSB). In the "ADD" operation, these bits are sequentially input to the registers 50 to 53 from the LSB to the MSB, bit by bit, in response to a clock signal CLK. Synchronized with the data, the operation code "ADD" for addition is set in the register 15-1. The carry control signal XGCR is input to the GLU so as to indicate the carry clear with the value "0" in the first clock, and so as to indicate the normal calculation with the value "1" in the next clock.

The first stage GLU 16-1 to 16-4 performs an addition calculation for 32 bits regarding the bit B0 (LSB) under the order OP-1 in response to the first clock. The first stage 16-1 to 16-4 next performs an addition calculation of 32 bits regarding the bit B1 in response to the next clock. In this addition calculation, the carry operation is taken into consideration for the resultant data of the bit B0. These calculations are continued until the bit B3 has been processed.

The resultant data obtained by the GLU 16-1 to 16-4 is set in the register 54 to 57. In this case, the order OP-1 is moved to the OP-2 at every clock.

The final stage GLU 16-5 performs the addition calculation for four input signals in response to the order OP-2. The resultant data is output to the register 58. Since the collection circuit is constituted by two stages, the GLU 16-5 performs the same operation as that of the GLU 16-1 to 16-4 after a delay of one clock.

As explained above, the calculation is performed using the pipe-line method. Regarding the calculation of "MAX" and "MIN", the same calculation as mentioned above can be performed with the optional bit length. In this case, the bits are input from the MSB to the LSB.

Figure 8:
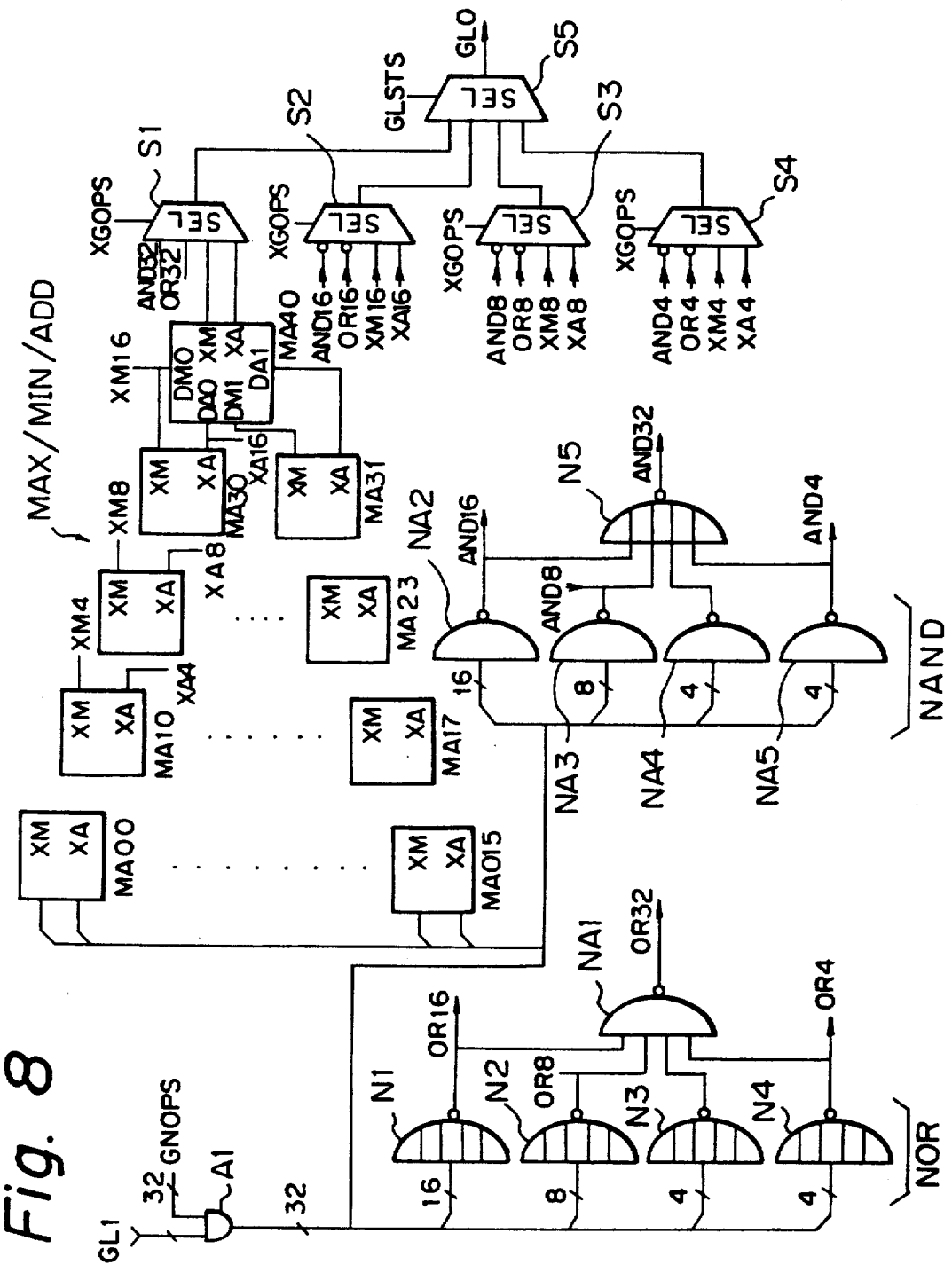
FIG. 8 is a detailed block diagram of a gathering logic unit shown in FIG. 4.

FIG. 8 is a detailed block diagram of a gathering logic unit shown in FIG. 4. In FIG. 8, Al denotes an AND circuit, N1 to N5 denote NOR circuits, NA-1 to NA-5 denote NAND circuits, S1 to S5 denote selectors, and MA00 to MA40 denote MAX/MIN/ADD calculation circuits. The AND circuit A1 sets the input data GLI to all zeroes when the control signal GNOPS is the value "0". The NOR circuits N1 to N4 and the NAND circuit perform the OR calculation in accordance with the number of input stages regarding the input data GLI. The NAND circuits NA2 to NA5 and the NOR circuit N5 perform the AND calculation regarding the input data GLI. The MAX/MIN/ADD calculation circuits MA00 to MA40 perform the maximum/minimum/addition calculation. The selectors S1 to S4 select the output in accordance with the operation code XGOPS. The selector S5 performs the selection in accordance with the number of the input stage.

Figure 9:
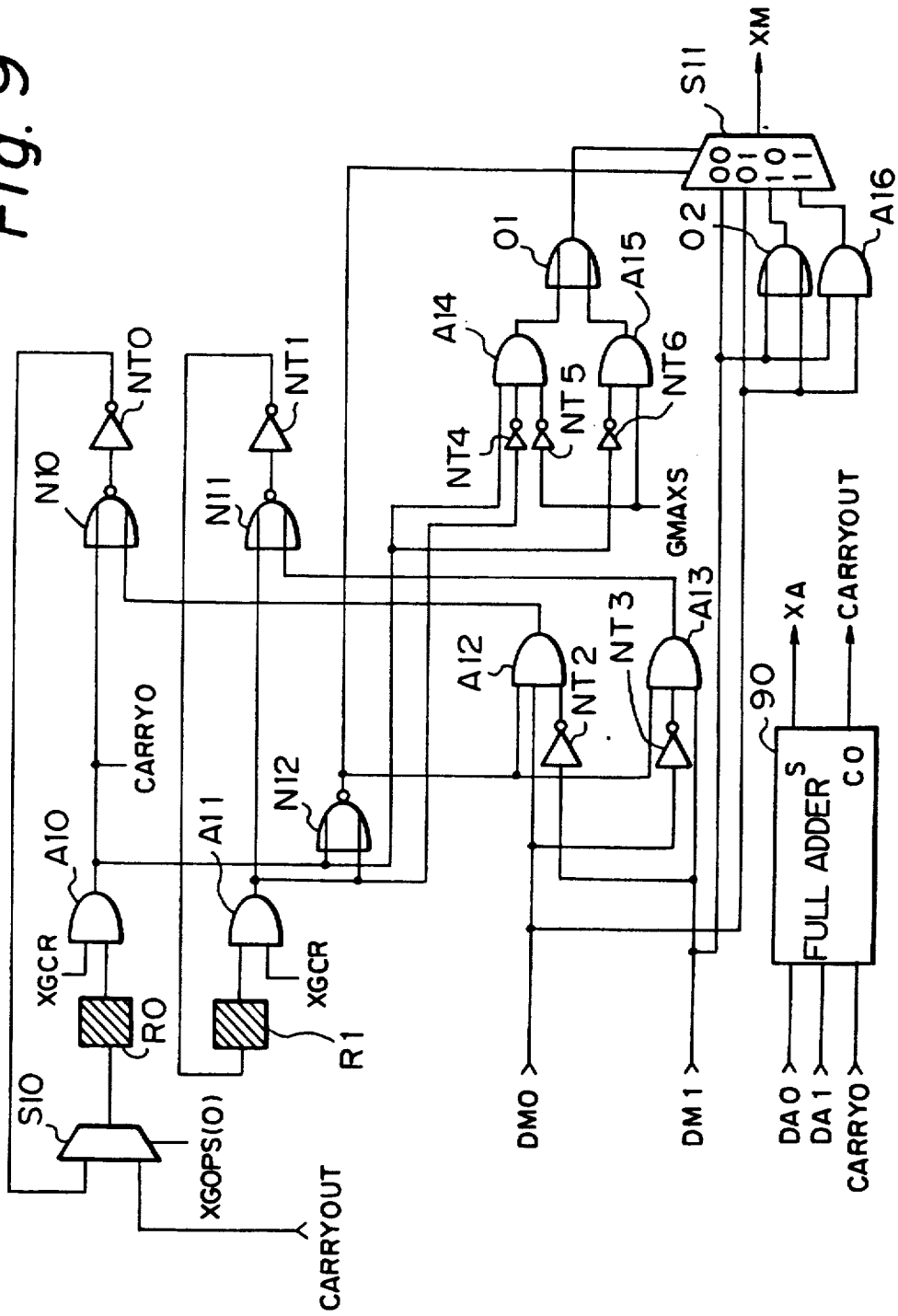
FIG. 9 is detailed block diagram of the MAX/MIN/ADD calculation circuit shown in FIG. 4.

FIG. 9 is detailed block diagram of the MAX/MIN/ADD calculation circuit. In FIG. 9, A10 to A16 denote AND circuits, N10 to N12 NOR circuits, NT0 to NT6 NOT circuits, 01 to 02 OR circuits, R0 to R1 registers, S10 to S11 selectors, and 90 a full adder having three inputs.

This circuit performs a maximum/minimum calculation for 2 inputs. DM0 and DM1 are the input signals each having one bit to obtain a maximum/minimum value. DA0 and DA1 are the input signals each having one bit for addition. XM is resultant data for a maximum/minimum calculation and XA is resultant data for addition. In the first stage MA00 to MA15 illustrated in FIG. 8, the DM0 is equal to the DA0, and the DM1 is equal to the DA1, respectively.

The operation of the addition "ADD" is explained in detail below. The addition data is input to the DA0 and DA1 bit by bit beginning with from the LSB bit. In the first bit, since the signal XGCR is the value "0", the carry is cleared so that the carry CARRY-0 becomes "0". The adder 90 performs the addition regarding the DA0 and DA1, and the resultant data XA is output therefrom. When no carry is performed in the addition, the output signal CARRYOUT becomes "0". When a carry is performed, the output signal CARRYOUT becomes "1". The signal CARRYOUT is held in the register R0 for use in the addition at the next clock through the selector S10. In the next bit from the LSB, the content of the register R0 is used as the carry CARRY-0, and is added to the DA0 and DA1.

The operation for obtaining the maximum value is explained in detail below. When obtaining the maximum value, the signal GMAXS is the value "0", the input data is input to the DM0 and DM1 at every bit beginning with the MSB bit. In the first bit, the signal XGCR is "0", and the outputs of the AND circuit A10 and A11 are "0" so that the output of the NOR circuit N12 becomes "1" and the outputs of the AND circuits A14, A15 and the OR circuit 01 become "0". Accordingly, the selection signal in the selector S11 becomes "10" so that, as the maximum output XM, the output of the OR circuit 02 is selected in the OR logic operation between the DM0 and DM1. In the registers R0 and R1, when one of the DM0 and DM1 previously becomes "1", the value "1" is set to the corresponding side. That is, when the DM0 is "1" and the DM1 is "0", the value "1" is set to the register R0. On the contrary, when the DM0 is "0" and the DM1 is "1", the value "1" is set to the register R1.

When the value "1" is input to one of the registers R0 and R1, the output of the NOR circuit N12 becomes "0" from the next clock. Further, the output of the OR circuit 01 becomes "1" when the register R0 is "1" and becomes "0" when the register R1 is "1". Accordingly, after the above selection, the selector 11 outputs the value of either the DM0 or the DM1 in which the value "1" was previously detected.

The operation for obtaining the minimum value is explained in detail below. When obtaining the minimum value, the signal GMAXS is the value "1". The operation is the same as that for the maximum. When the output of the NOR circuit N12 is the value "1", the selection signal to the selector S11 is "11" and the output of the AND circuit A16 is selected. When one of the DM0 and DM1 becomes "1", one of the registers R0 and R1 becomes "1" and the selection signal to the selector S11 becomes "00" or "01". After the above selection, the minimum value in either DM0 or DM1 is selected.

Figure 10:
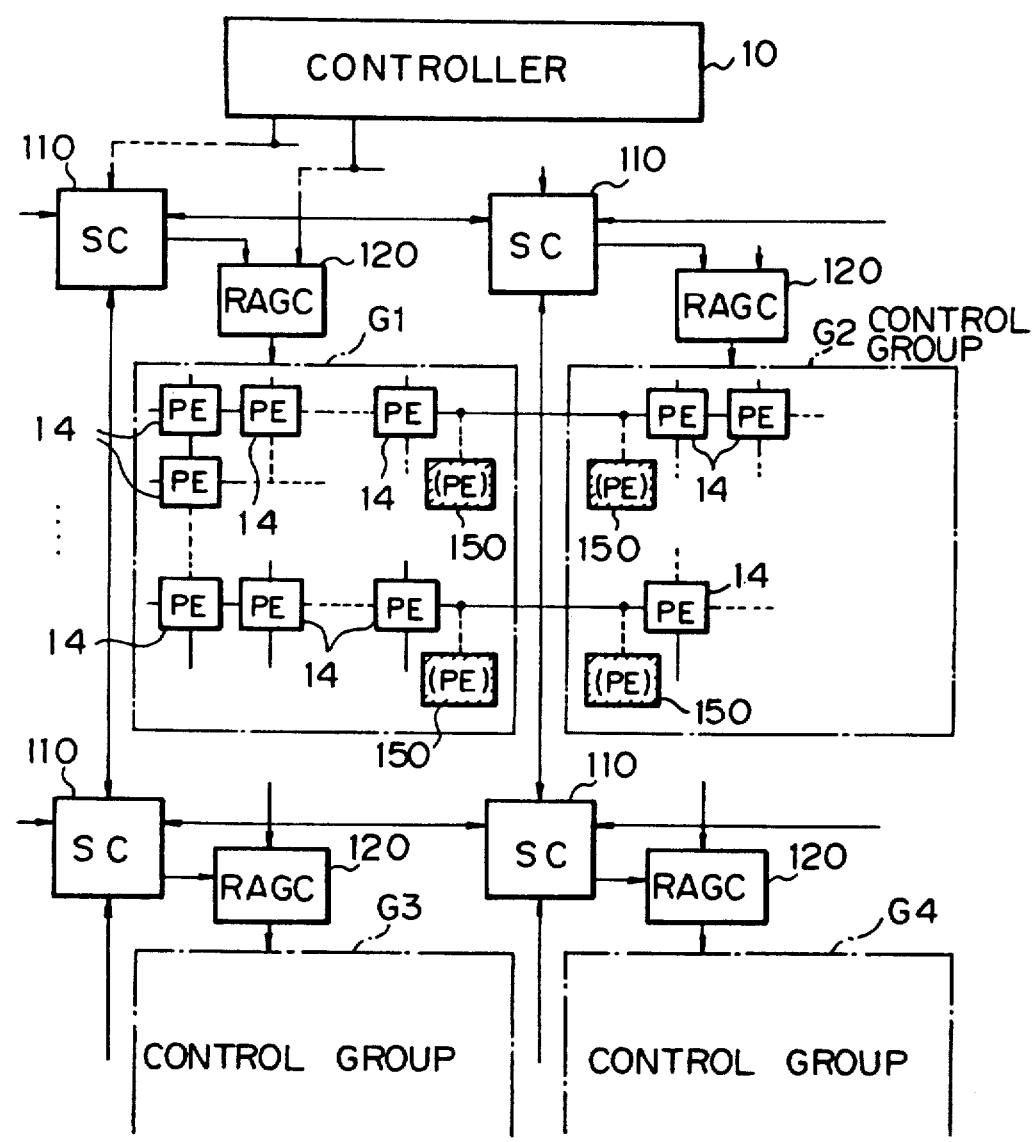
FIG. 10 is basic block diagram of the other type of parallel computer system according to the present invention.

FIG. 10 is a basic block diagram of the other type of parallel computer system according to the present invention. In FIG. 10, reference number 110 denotes a scheduling circuit SC, 120 a real address generation circuit RAGC, and 150 a pseudo processor element. Further, G1 to G4 denote control groups to be used as a control unit for accessing the address. Accordingly processor elements are divided into several control groups. The scheduling circuit 110 and the real address generation circuit 120 are provided for each control group.

The scheduling circuit 110 is a circuit for receiving an event signal to designate the address and for managing the address designated by the event signal by using a queue.

The real address generation circuit 120 is a circuit for generating a real address of the data to be processed by the processor element belonging to that control group. This address generation is performed based on a base address determined by the event signal and an address signal applied from the controller 10.

The pseudo processor element 150 is provided in the boundary portion of each control group. The pseudo processor element 150 has a function of sending the data corresponding to the address of the processor element when the processor element located to the boundary portion gives and takes the data between the adjacent processor elements belonging to the adjacent control group. This circuit is provided to ensure consecutiveness between the processor elements.

Figure 11:
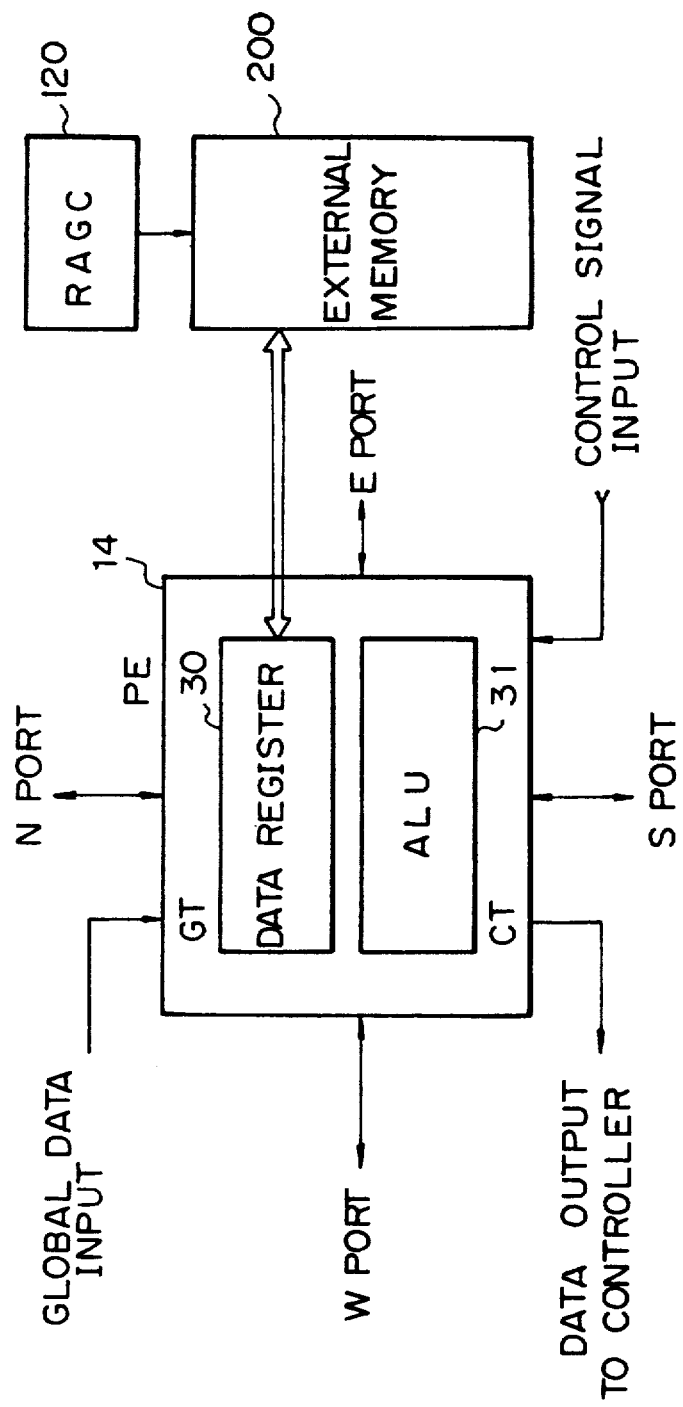
FIG. 11 is a schematic block diagram of a processor element shown in FIG. 10.

FIG. 11 is a schematic block diagram of a processor element shown in FIG. 10. This drawing is the same as FIG. 3 except that an external memory 200 is added between the data register 30 and the real address generation circuit 120. The address of the external memory 200 is applied from the real address generation circuit 120 provided in every control group. This type of parallel computer system according to the present invention mainly relates to the address control for the external memory 200.

Figure 12:
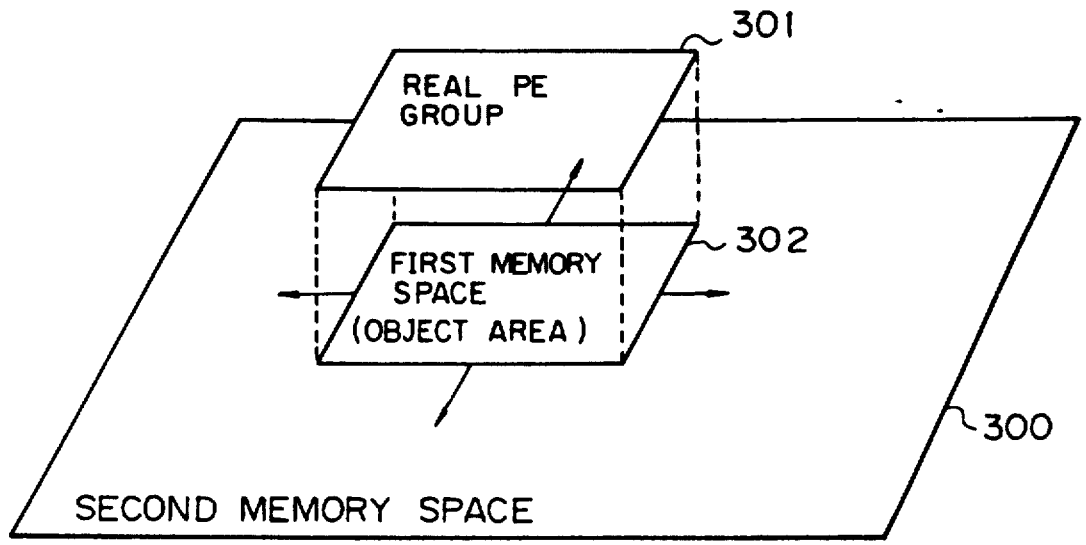
FIG. 12 is a view for explaining the concept of the present invention shown in FIG. 10.

FIG. 12 is a view for explaining the concept of the present invention shown in FIG. 10. Reference number 301 denotes an actual processor element group, 302 a first memory space corresponding to the actual processor element group 301, and 300 a second memory space (virtual area) corresponding to a virtual processor element group. Accordingly, the first memory space 302 coincides with an object area to be processed by the actual processor element group 301. In general, the object area to be processed (for example, a wire pattern area) coincides with the size of the actual processor element group. However, in the present invention, the object area can be widened up to the second memory space. In this case, the actual processor element group 301 moves to the second memory space 300 so that it is possible to process data regarding the larger object area exceeding the first memory space. Therefore, although the virtual processor element group does not actually exist it is possible to obtain the same performance as the processor element group having the second memory space 300 by moving the actual processor element group 301.

Figure 13:
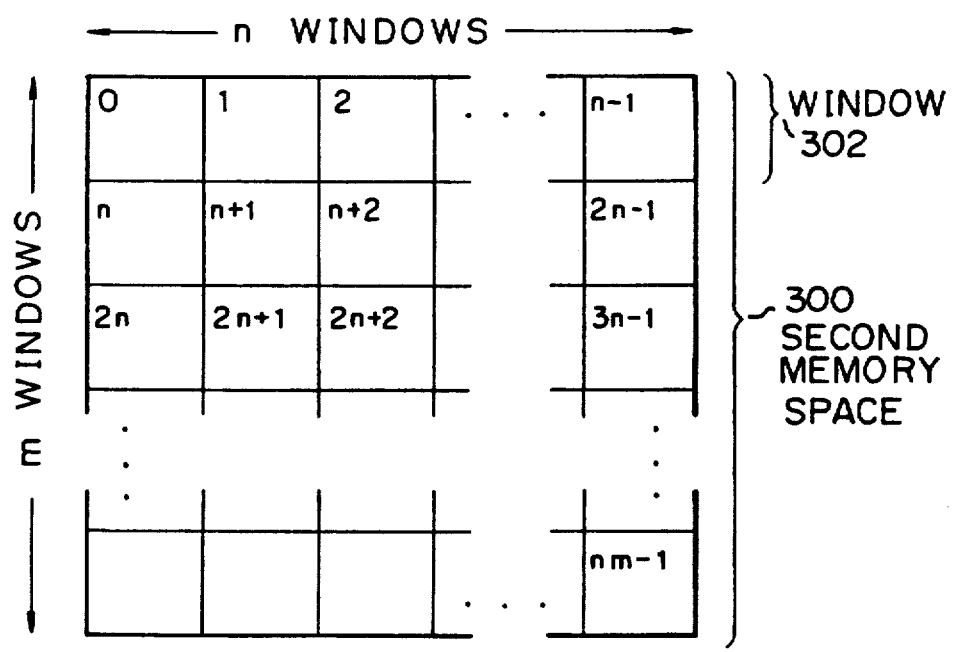
FIG. 13 is a view for explaining the division of the virtual area shown in FIG. 12.

FIG. 13 is a view for explaining division of the virtual area shown in FIG. 12. The second memory space 300 is divided into a plurality of windows (m x n window). Accordingly, one window corresponds to the first memory space 302 processed by the actual processor element group 301. The window number is attached to each window from 0 to nm-1, respectively.

Figures 14A, 14B:
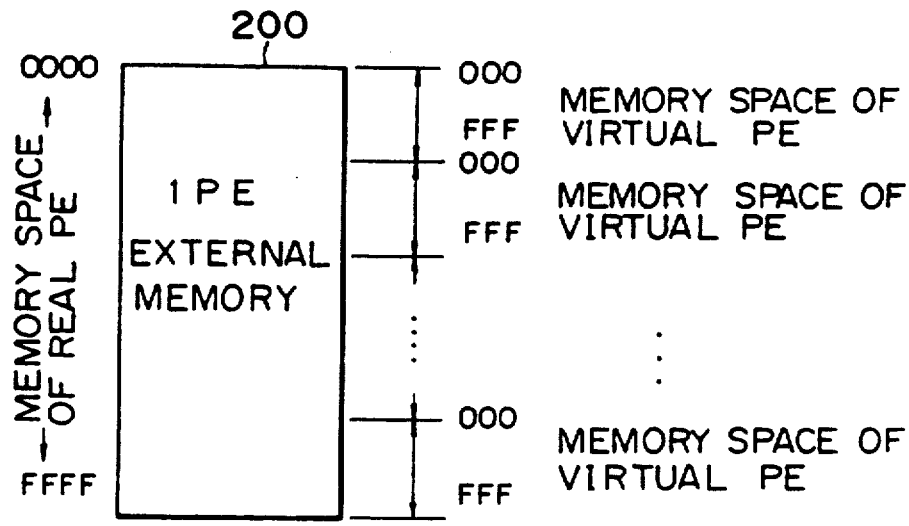
FIGS. 14A and 14B are views for explaining addresses of memory spaces shown in FIG. 12.

FIGS. 14A and 14B are views for explaining addresses of memory spaces. In FIG. 14A, the external memory 200 of one processor element 14 is divided into sixteen memory spaces for the virtual processor element. That is, "0000" to "FFFF" are addresses for the external memory each having sixteen bits. While, "000" to "FFF" are addresses for the virtual area each having twelve bits. Accordingly, one actual processor element functions as sixteen virtual processor elements.

In FIG. 14B, the window number denotes the base address indicating the head of each memory space of the virtual PE (processor element) and constituted by eight bits "aaaa 0000" since a maximum of 256 windows can be provided. Since the external memory 200 is divided into sixteen blocks in this embodiment, the lower four bits are set to "0000". The virtual PE address "0000 bbbbbbbbbbbb" denotes the relative address of each memory space of the virtual PE. The virtual PE address is transmitted in common to all processor elements from the controller 10. The virtual PE address has "0000" in the upper bits in accordance with the number of the window. As explained in FIG. 14A, when the number of the window is sixteen, the virtual PE address is constituted by twelve bits. As shown in FIG. 14B, the real address "aaaabbbbbbbbbbbb" having sixteen bits of the external memory 200 can be obtained by adding (or performing an OR operation) the base address and the virtual PE address.

The processing of the data in the virtual PE is performed in such a way that the real PE sequentially processes the corresponding data in the virtual memory space divided from the real external memory 200. In this case, as the simplest method, there is a method in which the real PE always sequentially processes all virtual PE's including its own external memory. However, this method is not efficient because the virtual PE's in which the processing is not necessary are included. Accordingly, the method of the present invention selects the virtual PE's in which the processing is necessary so that the efficiency of the processing can be raised. Therefore, the concept of the "event" is employed to realize this method in the present invention.

The event is started when the conditions to be processed to the virtual PE are realized. The virtual PE which received the event is handled as the object to be processed by the real PE. The controller determines the content of the event in accordance with a program.

Figure 15:
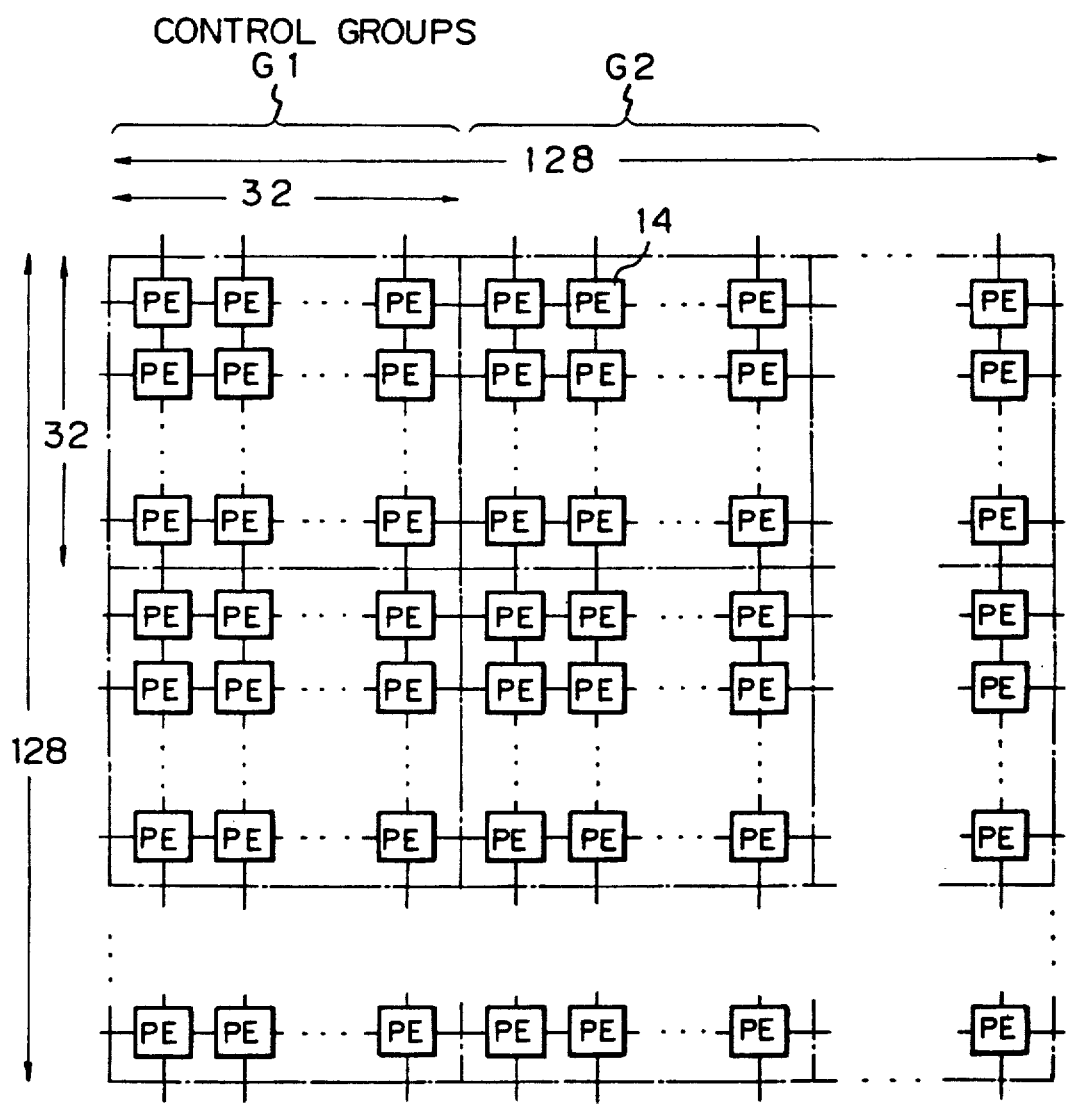
FIG. 15 is a view for explaining control groups shown in FIG. 10.

FIG. 15 is a view for explaining control groups shown in FIG. 10. As shown in the drawing, the processor elements (PE) 14 are divided into the control groups G1, G2, —. For example, the PE's of 128×128 are divided into sixteen control groups G1 to G16 each having 32×32 PE's.

Figure 16:
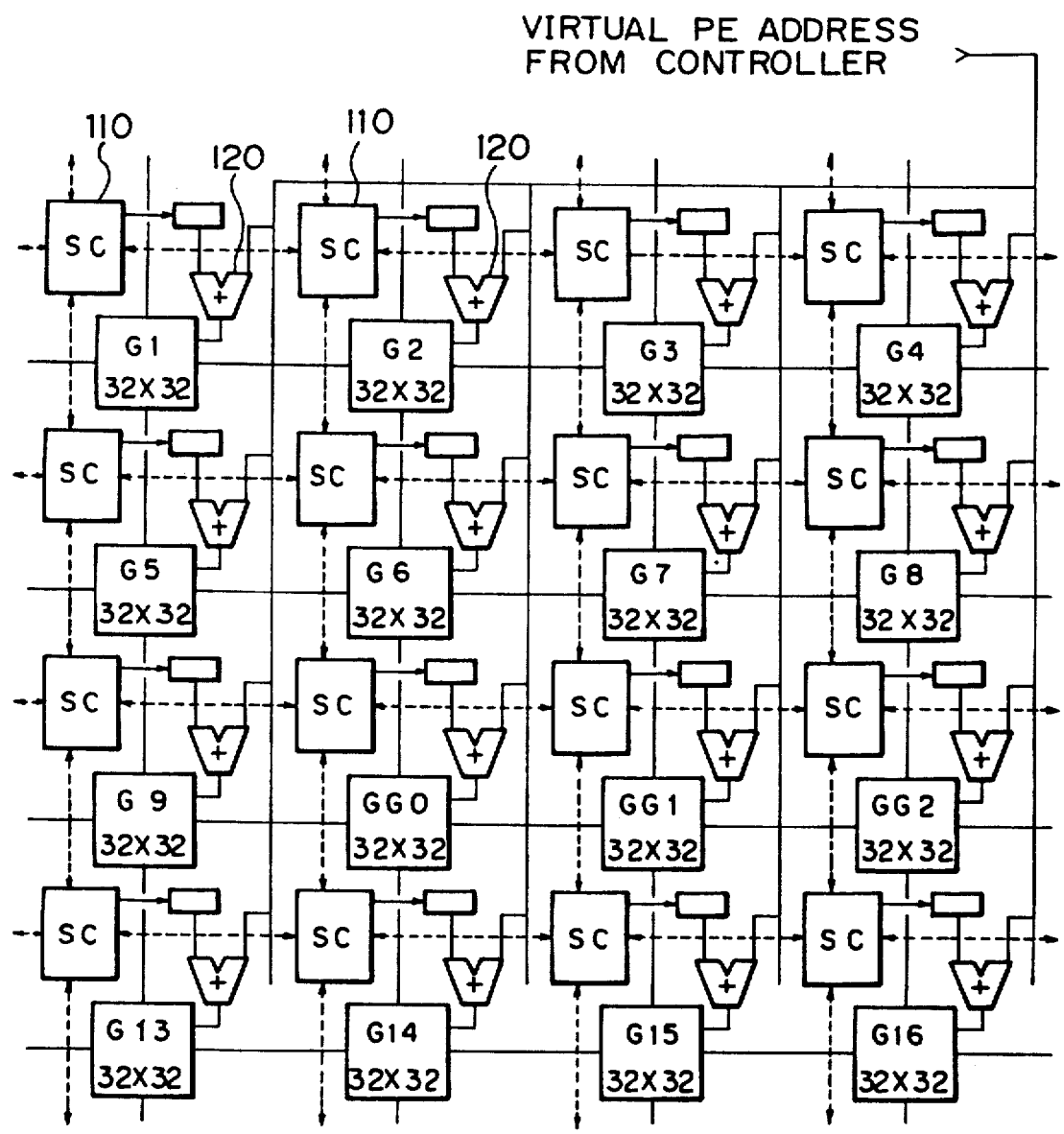
FIG. 16 is a block diagram of control groups and peripheral circuits.

FIG. 16 is a block diagram of control groups and peripheral circuits. In FIG. 16, G1 to G16 are control groups, 110 (SC) is the scheduling circuit provided for each control group, and 120 is a real address generation circuit also provided for each control group. The scheduling circuit 110 receives the event from the PE and manages the virtual PE to be processed. The virtual PE number to be processed, i.e., the window number, is queued in the scheduling circuit 110 and sequentially processed from the head of the queue. The scheduling circuit 110 sends the base address corresponding to the virtual PE to the real address generation circuit 120. Accordingly, the scheduling circuit 110 performs the queueing and assigns the real PE.

The real address generation circuit 120 generates the real address based on the relative address of the virtual PE and the base address. In this case, the relative address indicates a kind of control signal transmitted in common from the controller to all PE's, and the base address is determined by the scheduling circuit 110. The real address is transmitted to the real PE's in each control group.

The scheduling circuit 110 is connected to four adjacent scheduling circuits. Each input/output signal is explained below.

Event signal (as input signal)

This event signal is obtained by the OR logic among the event signals transmitted from all PE's (32 PE's in this embodiment) located on the boundary of the control group, and is used as the input signal. This signal is one bit for four directions of E, W, N, and S.

Window number signal (as input signal)

The window number signal of the adjacent scheduling circuit 110 is input as the input signal. The window number signal has eight bits as shown in FIG. 14B for four directions of E, W, N, and S. The scheduling circuit inputs the corresponding window number to the event signal when that event signal is activated, and performs the queuing.

Self-event signal (as input signal)

This signal is obtained by the OR logic among all event signals of the PE's included in its own control group, and has one bit.

Window number signal (as output signal)

This signal is the window number signal output to the adjacent scheduling circuit 110, and has eight bits for four directions of E, W, N, and S.

Base address signal (as output signal)

This signal is an output signal to the real address generation circuit 120 indicating the corresponding address to the window number of the virtual PE read-out from the head of the queue.

Various control signals (as input/output signal)

These signals are output or input signals to or from the controller 10. For example, the control signal NEXT is a signal to indicator reading out a next virtual PE from the queue, and the control signal DIR is a signal to indicate the direction of the data flow in four directions E, W, N, and S. The control signal EMPTY is a signal to indicate vacancy of the input signal, the clock signal, and the queue.

Figure 17:
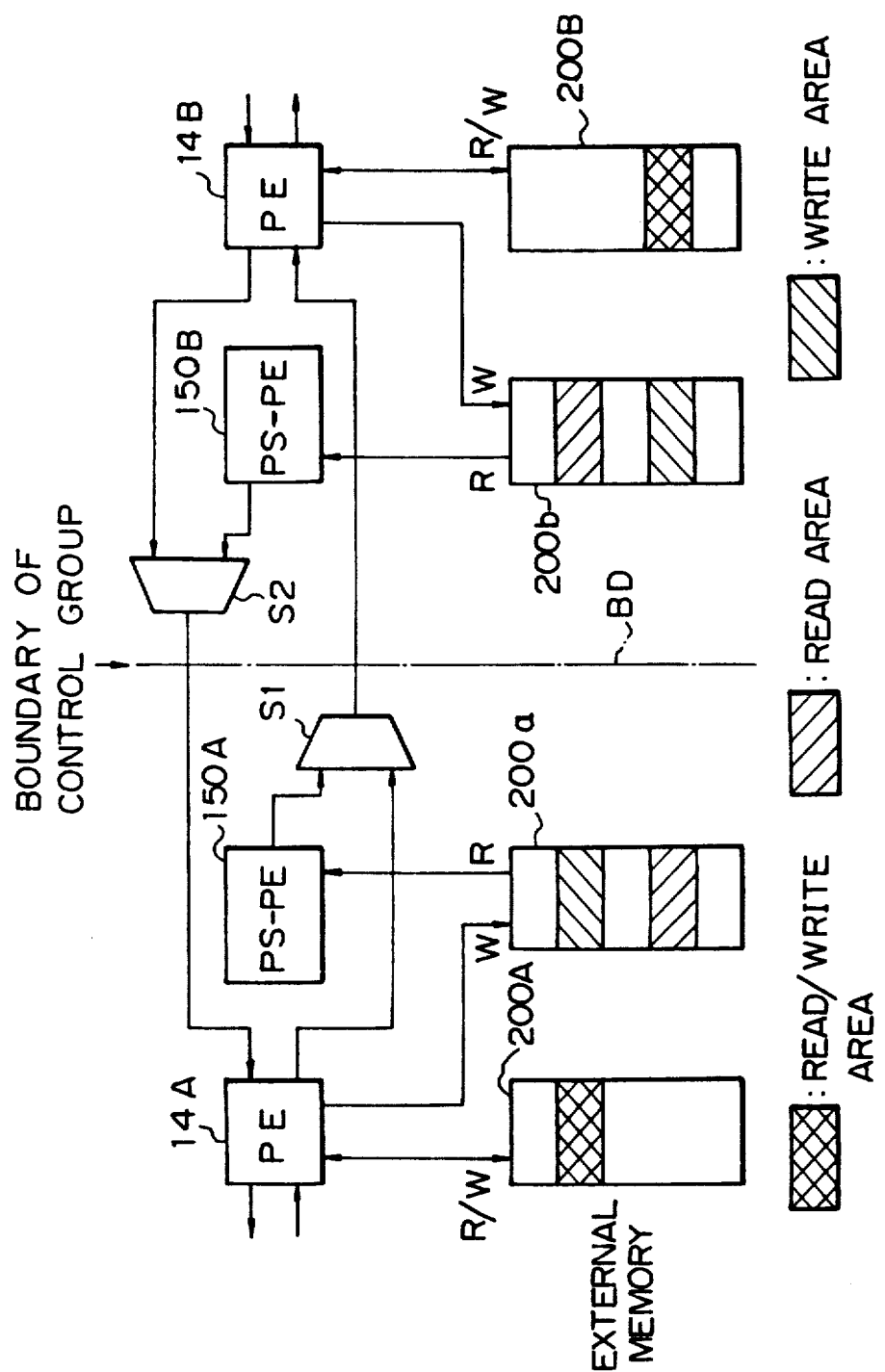
FIG. 17 is a block diagram of for explaining the pseudo processor element.

FIG. 17 is a block diagram for explaining the pseudo processor element (PE) shown in FIG. 10. In FIG. 17, the boundary BD of the control group is provided between the processor elements 14A and 14B. That is, the PE 14A is adjacent to the PE 14B. The pseudo PE (PS-PE) 150A is provided adjacent to the PE 14A, and the pseudo PE 150B is provided adjacent to the PE 14B, respectively.

The pseudo PE is provided for ensuring the consecutiveness of the processing between adjacent control groups. This is because the adjacent control group can not receive the necessary value of the window when the object window between the adjacent control groups is different. Accordingly, as shown in FIGS. 10 and 17, the pseudo PE is provided to each end of the row of the PE's in each control group. Therefore, when the object window is consecutive between adjacent control groups, the pseudo PE's are not used and the PE 14A directly accesses the PE 14B by switching the selectors S1 and S2.

When the PE 14A performs the read/write (R/W) operation to its own external memory 200A, the write data is simultaneously written to the external memory 200a belonging to the pseudo PE 150A. When the PE 14A transmits the data to the PE 14B, the pseudo PE 150A read the data from the external memory 200a and transmits that data to the PE 14B through the selector S1 instead of the PE 14A. The address of the external memory 200a is the window address of the PE 14B side. The same operation as the above is performed in case of the data transmission from the PE 14B to the PE 14A. Although this drawing shows the connection of one direction as the lattice of one dimension, it is possible to connect two directions as a lattice of two dimensions.

Figure 18:
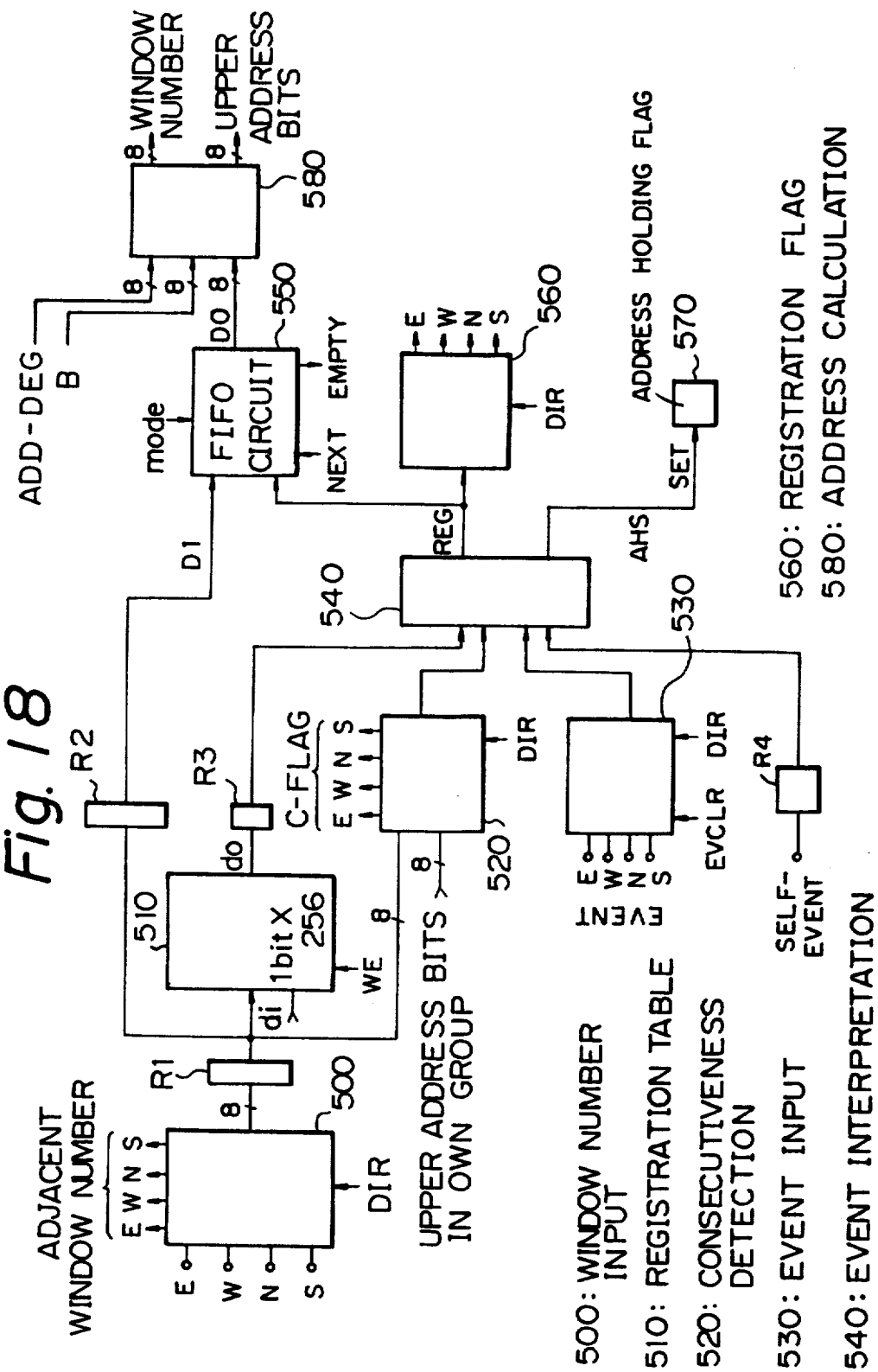
FIG. 18 is a detailed block diagram of the scheduling circuit shown in FIG. 10.

FIG. 18 is a detailed block diagram of the scheduling circuit shown in FIG. 10 and FIGS. 19 to 25 are detailed circuits of the diagram in FIG. 18. In FIG. 18, reference number 500 denotes an input circuit for the window number, 510 a registration table, 520 a consecutiveness detection circuit, 530 an input circuit for the event, 540 an event interpretation circuit, 550 a first-in/first-out (FIFO) circuit, 560 a registration flag circuit, 570 an address holding circuit, and 580 an address calculation circuit. Further, R1 to R4 denote registers for the pipe-line control.

The input circuit 500 inputs the window number determined from the four adjacent directions E, W, N, and S, where DIR is the control signal for indicating the data flow. This circuit is shown in detail in FIG. 19.

Figure 19:
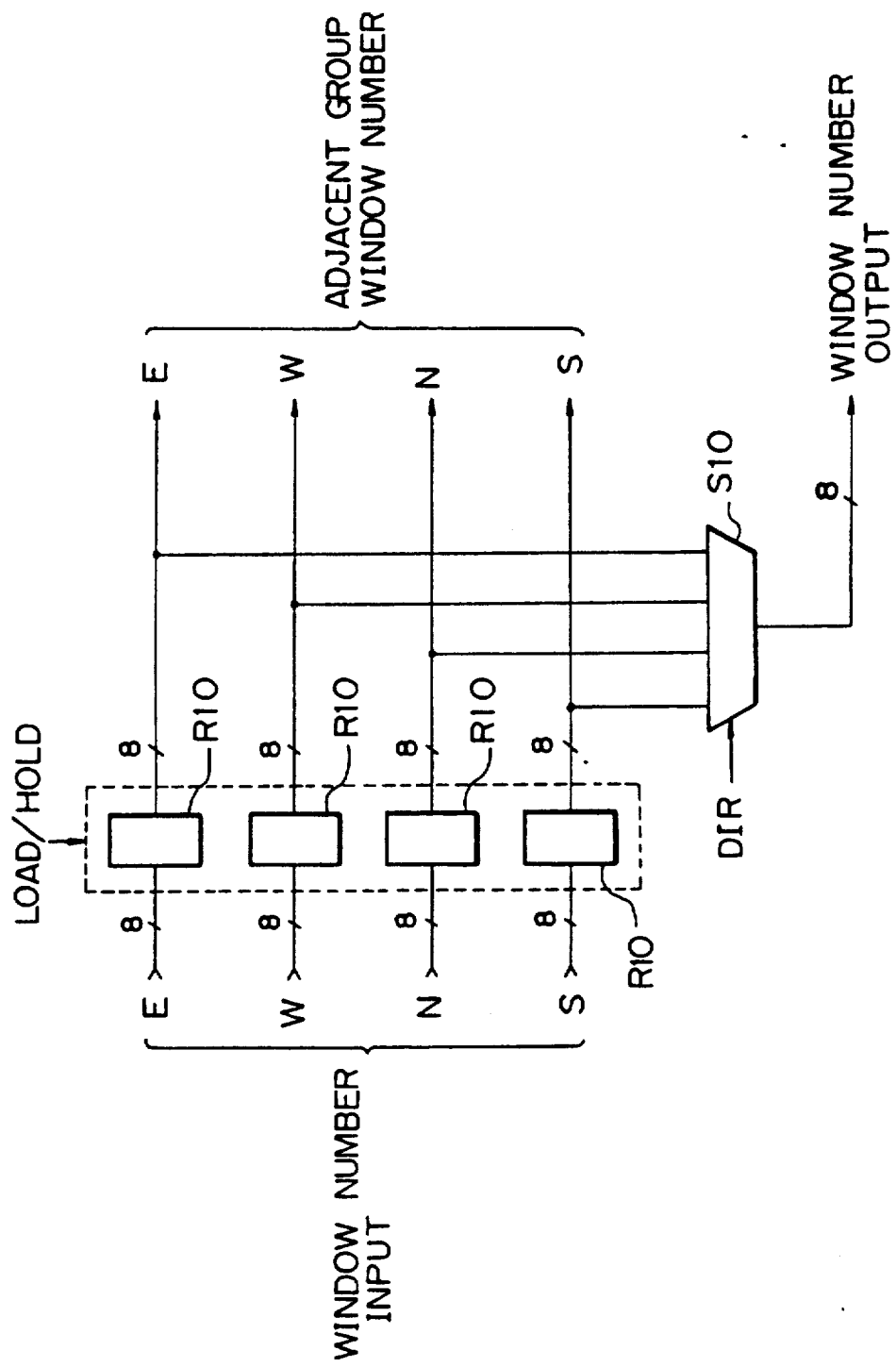
FIG. 19 is a detailed block diagram of the input circuit for the window number shown in FIG. 18.

In FIG. 19, R10 denotes a register for holding the window numbers input from four directions E, W, N and S. S10 denotes a selector for selecting the window number in response to the control signal DIR and outputting the selected window number having eight bits.

The registration table 510 is a table for storing flags indicating whether or not the window number is registered. One bit is assigned to each window in a maximum of 256 windows. Accordingly, the window number from the input circuit 500 becomes the address in the table 510. Therefore, double registration of a window number is prevented by this method.

The consecutiveness detection circuit 520 determines the consecutiveness between the present area and the adjacent area. The detailed circuit is shown in FIG. 20.

Figure 20:
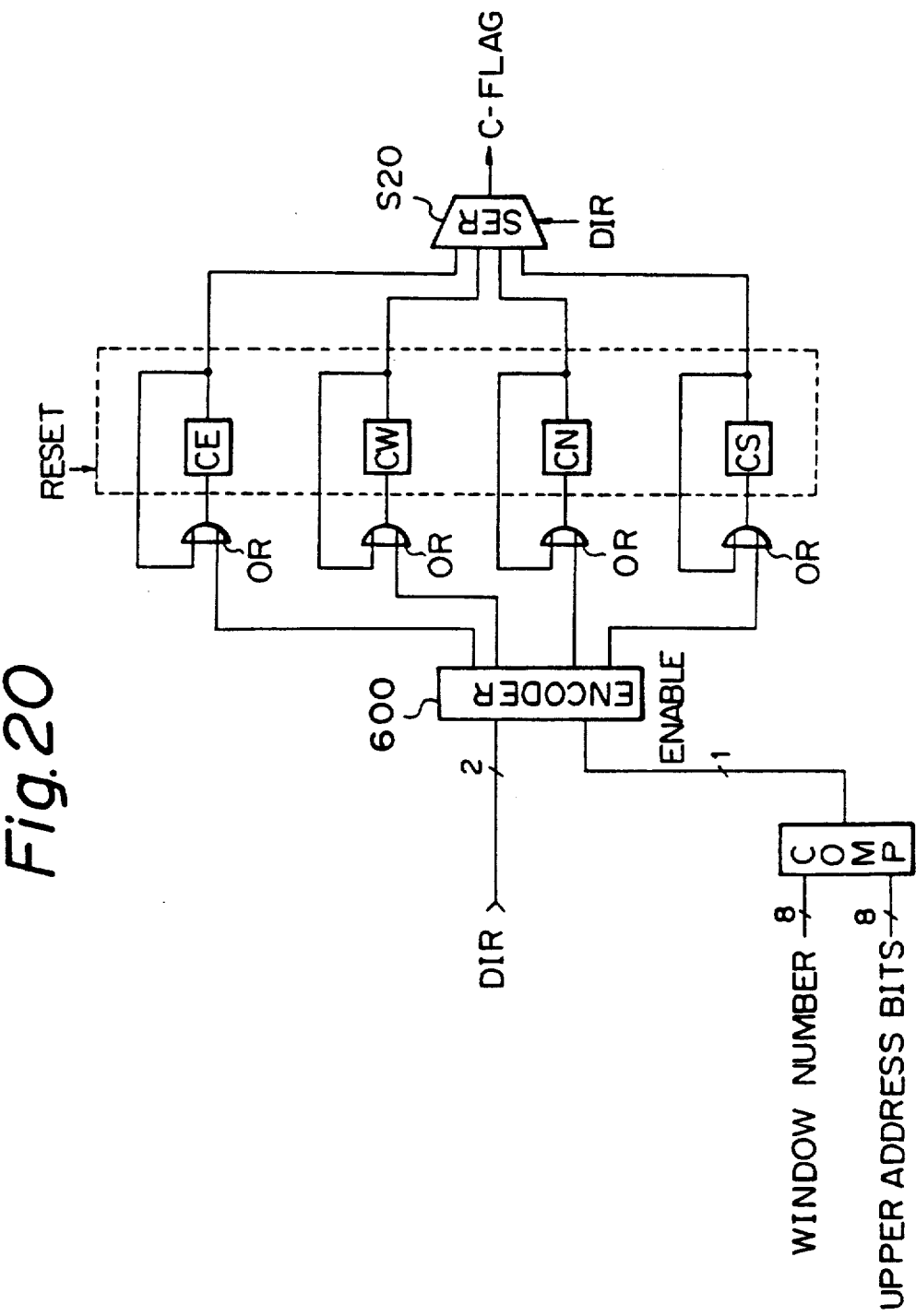
FIG. 20 is a detailed block diagram of the consecutiveness detection circuit shown in FIG. 18.

In FIG. 20, COMP denotes a comparator, 600 an encoder (ECD), OR an OR circuit, and S20 a selector (SEL). CE, CW, CN and CS denote registers for storing the resultant data of the detection of the consecutiveness until the reset signal is input. The comparator COMP compares the upper bits of the address of its own control group with the window number input from the input circuit 500. When the former coincides with the latter, the encoder 600 outputs an enable signal in response to the direction control signal DIR. The enable signal is stored in the registers CE, CW, CN and CS as consecutiveness data and the consecutiveness data C-FLAG is output from the selector S20 in response to the control signal DIR.

The event input circuit 530 receives the event signals from four directions. The detailed circuit is shown in FIG. 21.

Figure 21:
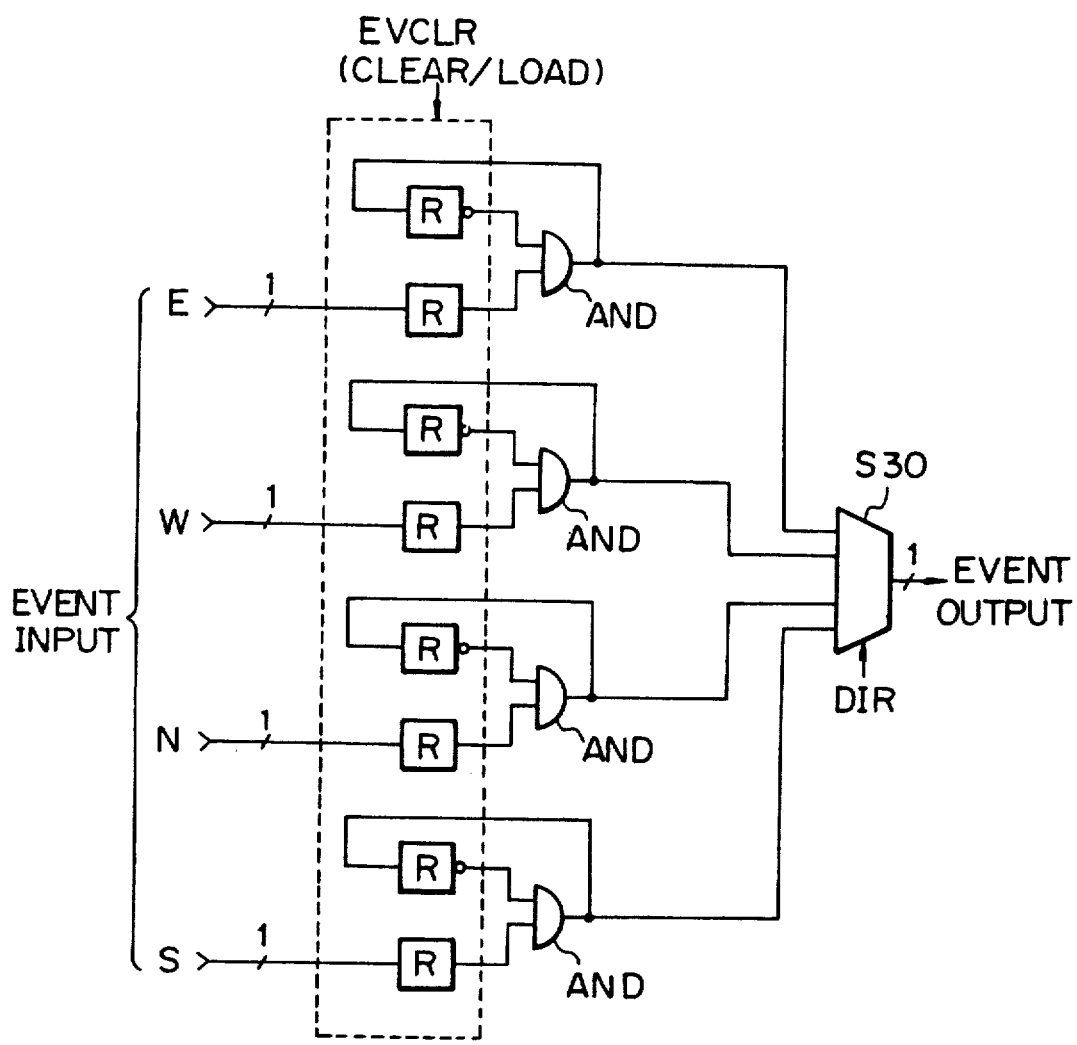
FIG. 21 is a detailed block diagram of the event input circuit shown in FIG. 18.

In FIG. 21, EVCLR denotes an event clear signal to clear each register R. S30 denotes a selector circuit. The register R is cleared by the event clear signal EVCLR. When the event signal is loaded in the register R, the event signal is output from the selector S30 through the AND circuit.

The event interpretation circuit 540 judges whether or not the queuing of the window number should be performed, or whether or not the present address should be held. The detailed logic table for determining the output from this circuit 540 is shown in FIG. 22.

In FIG. 22, T denotes an active state of the signals. The registration signal REG indicating the queuing of the window number is output from the circuit 540 only when the output of the input circuit 530 is active. The address holding signal AHS is output when the consecutiveness signal C-FLAG and the event signal are active. Further, the address holding circuit is output when the self-event signal is active.

The FIFO 550 stores the window number to be processed in accordance with the event signal. The detailed circuit is shown in FIG. 23.

Figure 23:
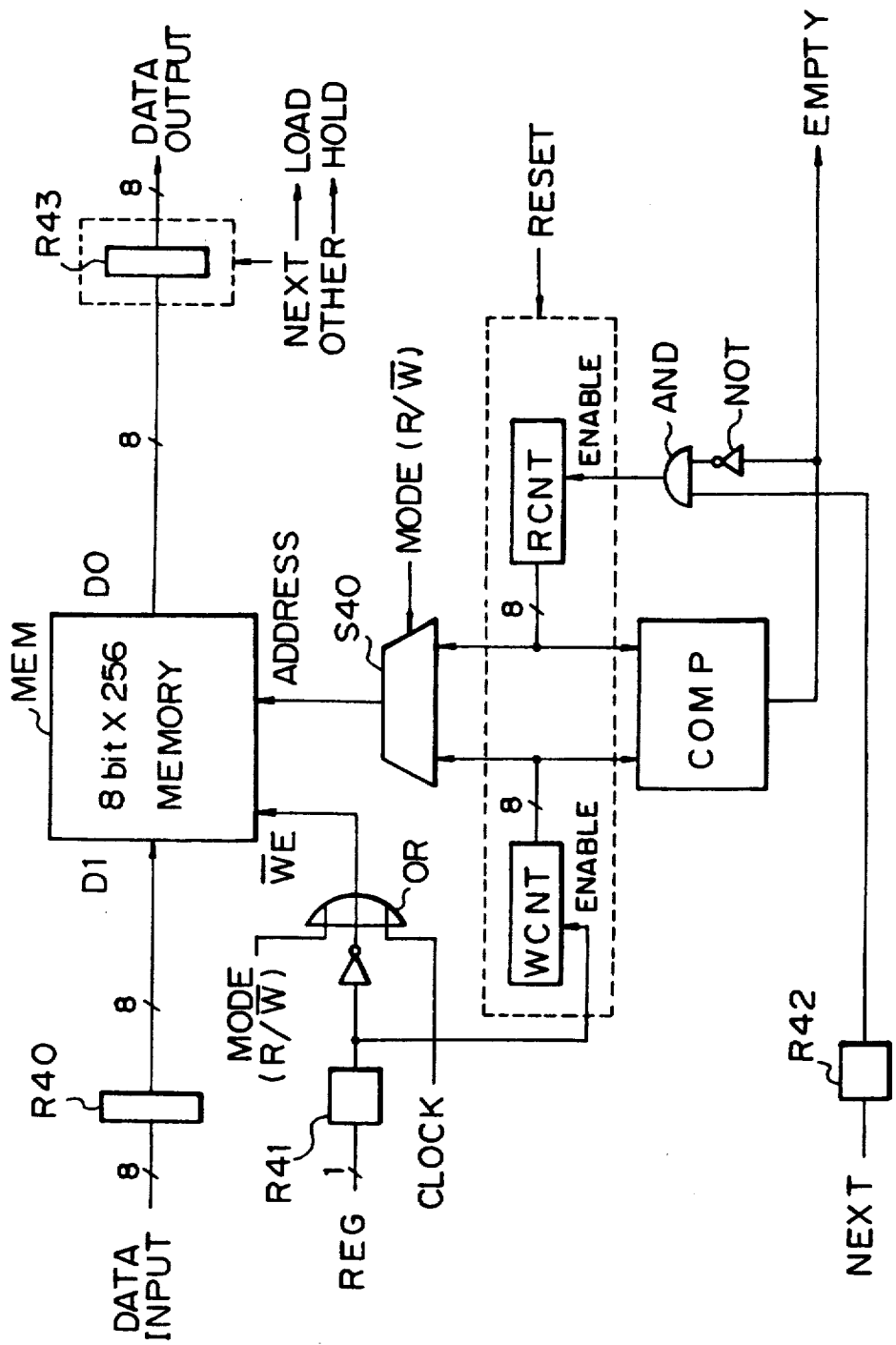
FIG. 23 is a detailed block diagram of the FIFO circuit shown in FIG. 18.

In FIG. 23, MEM denotes a memory having the capacity of 8×256 bits, R40 to R43 registers, S40 a selector, WCNT a write counter to output the write address, RCNT a read counter to output the read address, and COMP a comparator. When the registration signal is set in the register R41, the window number stored in the register R40 is written to the address indicated by the write counter WCNT in the memory MEM. Further, the content of the address of the memory MEM is read out in response to the control signal NEXT through the register R42 and the AND circuit, and output through the register R43. When the comparator detects coincidence between the content of the write counter WCNT and the content of the read counter RCNT, a signal EMPTY indicating the vacant state is output.

Figure 24:
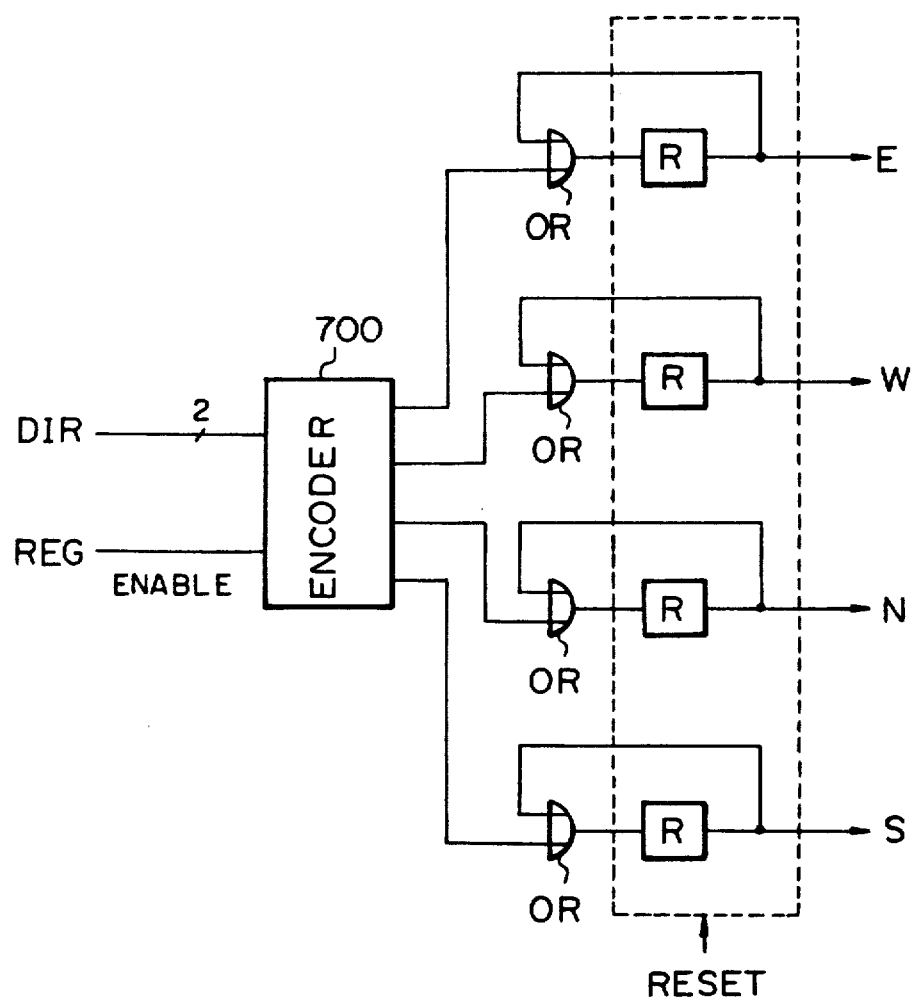
FIG. 24 is a detailed block diagram of the registration flag circuit shown in FIG. 18.

The registration flag circuit 560 is shown in detail in FIG. 24. In FIG. 24, 700 denotes an encoder, and R a register. The direction of the registered window number is stored in the register R after being encoded by the encoder 700 in accordance with the direction control signal DIR.

The address calculation circuit 580 outputs the window number to be informed to the adjacent control group and the upper address bits used for generation of the real address based on the window number read out from the FIFO 550. The detailed circuit is shown in FIGS. 25A to 25C.

Figure 25A:
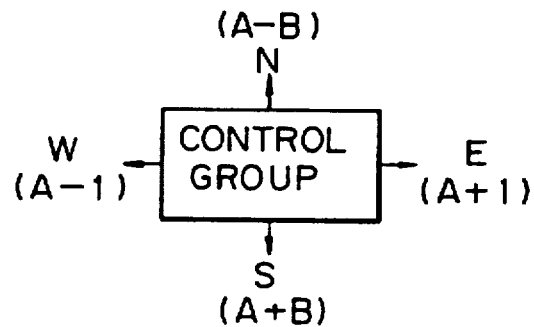
FIGS. 25A to 25C are detailed block diagram of the address circuit shown in FIG. 18.

In FIG. 25A, in the boundary of the window, the control group sends the window numbers (A+1) and (A−1) for the horizontal direction, and sends the window numbers (A+B) and (A−B) for the normal direction, where B denotes the number of the window for the transverse direction when the virtual area is divided into the plural windows.

Figure 25B:
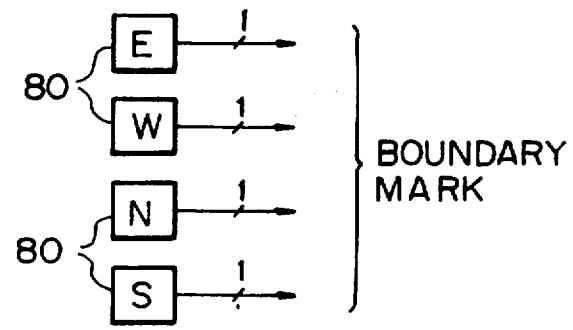

In FIG. 25B, the boundary of the window is distinguished by the boundary marks (E, W, N, S) 80. The value of each boundary mark is set by the controller 10 in the initial stage.

Figure 25C:
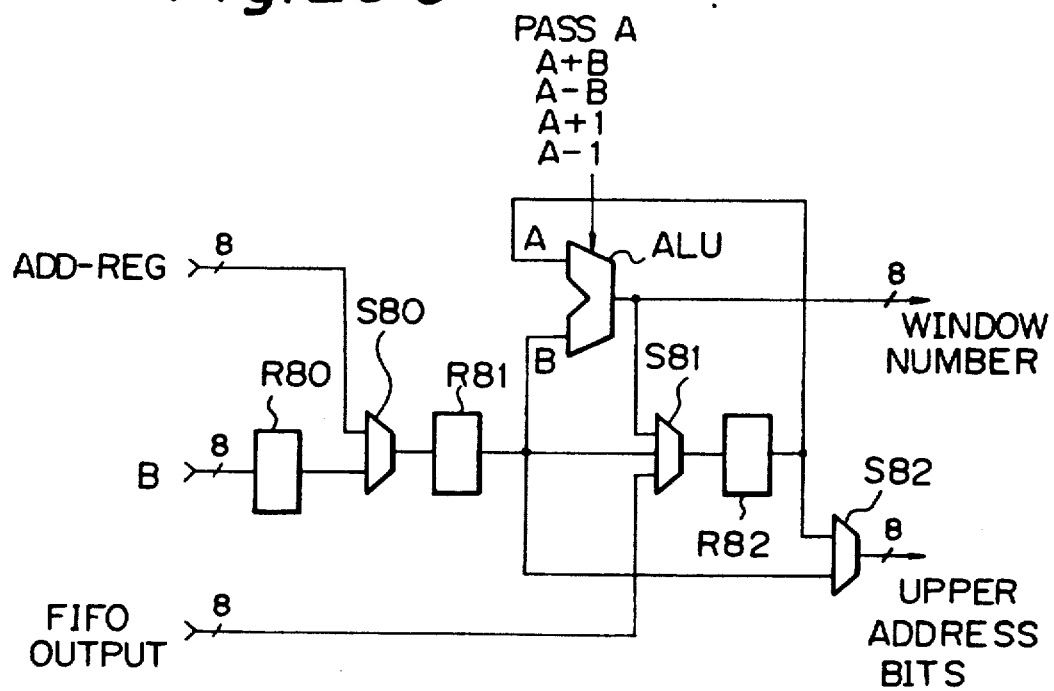

In FIG. 25C, ALU denote a calculation circuit, R80 to R82 denote registers, and S80 to S82 denote selectors. The calculation circuit ALU calculates any of the window numbers A, A±1, and A±B in accordance with the boundary mark E, W, N, S shown in FIG. 25B. An address designation value ADD-DEG indicates a mode using the address transmitted from the controller 10 as an absolute address regardless of the present window number. When this mode is designated, the address designation value ADD-DEG is transmitted to the real address generation circuit 120 through the selectors S80 and S82.

FIG. 26 is a detailed block diagram of the real address generation circuit. In FIG. 26, R100 to R105 denote registers, S100 to 103 denote selectors, and OR denotes OR circuits. The input signals to this circuit are the relative address of the virtual PE transmitted from the controller 10, the upper address bits output from the address calculation circuit 580, and the adjacent window numbers input from the input circuit 500. The real address to the PE belonging to its own control group is generated by adding the relative address set in the register R100 to the upper address bits set in the register R101 as shown in FIG. 14B. As shown in FIG. 14B, in the upper eight bits, when the base address and the relative address overlap, one side is set to "0". The real address is obtained by the logic OR calculation. In this case, the lower eight bits of the real address are the same bits as transmitted from the controller 10.

Further, to generate the real address for the adjacent pseudo PE, the window number of the adjacent PE is set in the registers R102 to R105. Further, the window numbers are controlled by the selectors S100 to S103 to be the address of the adjacent control group when loading (L), and to be the self-address when saving (S).

In this embodiment, although the multi-processor is constituted by lattice coupling, it is possible to constitute it by hyper-cubic coupling in accordance with the application.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be restored to as falling within the scope of the invention.

What we claim is:

1. A parallel computer system using a single instruction stream multiple data stream (SIMD) method, said parallel computer system having a controller and a plurality of processor elements, each of the processor elements having storage means for storing data to be processed and outputting output data processed by the processor elements the controller controls operation of the processor elements, and said parallel computer system performing processing of the data based on a calculation control signal and a synchronization signal transmitted from the controller, said parallel computer system comprising:

data collection means, connected between the processor elements and the controller and arranged in a binary tree configuration having stages, for receiving the output data from the processor elements responsive to the synchronization signal generated by and received from the controller, for performing a predetermined calculation based on the stages in the binary tree configuration, and for outputting calculated data to the controller; and calculation control means, connected between said data collection means and the controller and arranged in series corresponding to each of the stages, for transmitting the calculation control signal from the controller to said data collection means based upon a pipe-line method to perform the predetermined calculation in said data collection means, wherein said data collection means comprises a plurality of gathering logic units connected to each other in the binary tree configuration having the stages, first gathering logic units of a first stage of the stages receives the output data from each of the processor elements and outputs first calculation data, second gathering logic units of a second stage of the stages receives the first calculation data obtained from the first stage, and the first calculation data obtained from the second stage is output to a final gathering logic unit of a first stage of the stages as second calculation data, the final calculation data obtained from the final gathering logic unit of the final stage responsive to said second calculation data is output to the controller, and wherein said calculation control means comprises a plurality of control registers each corresponding to one of the stages, each of the plurality of control registers connected in series to each other by the pipe-line method, and each of the plurality of control registers sequentially outputting the calculation control signal to each of the gathering logic units in the corresponding stage.

2. A parallel computer system as claimed in claim 1, wherein the calculation control signal is one of an AND calculation signal, an OR calculation signal, and a MAX/MIN calculation signal.

3. A parallel computer system as claimed in claim 2, wherein each of said gathering logic units comprises:

an OR calculation means for performing a logic OR calculation on the output data from each of the processor element;

an AND calculation means for performing a logic AND calculation on the output data from each of the processor elements;

a MAX/MIN/ADD calculation means for obtaining one of a maximum value, a minimum value and an added value of the output data from each of the processor elements; and selector means for selecting one of said OR calculation means, AND calculation means and MAX/MIN/ADD calculation means, and for performing calculations in response to the calculation control signal.

4. A parallel computer system as claimed in claim 1, wherein each of said gathering logic units comprise:

an OR calculation means for performing a logic OR calculation on the output data from each of the processor elements;

an AND calculation means for performing a logic AND calculation on the output data from each of the processor elements;

a MAX/MIN/ADD calculation means for obtaining one of a maximum value, a minimum value, and an added value of the output data from each of the processor element; and selector means for selecting one of said OR calculation means, AND calculation means and MAX/MIN/ADD calculation means, and for performing calcluations in response to the calculation control signal.

5. A parallel computer system using a single instruction stream multiple data stream (SIMD) method, including processor elements and a controller generating control and synchronization signals, said parallel computer system comprising:

data collection means, connected between the processor elements and the controller and arranged in a binary tree structure having stages, for receiving output data from the processor elements responsive to the synchronization signal received by the processor elements from the controller, for performing a predetermined calculation responsive to the control signal based on the stages in the binary tree structure, and for outputting calculated data to the controller; and calculation control means, connected between said data collection means and the controller and arranged in series corresponding to each of the stages, for transmitting the control signal received from the controller to said data collection means based upon a pipe-line process, wherein said data collection means comprises a plurality of gathering logic units connected to each other in the binary tree structure having the stages, first gathering logic units of a first stage of the stages receives the output data from each of the processor elements and outputs first calculation data, second gathering logic units of a second stage of the stages receives the first calculation data obtained from the first stage, and the first calculation data obtained from the second stage is output to a final gathering logic unit of a final stage of the stages as second calculation data, and final calculation data obtained from the final gathering logic unit of the final stage responsive to said second calculation data is output to the controller, and wherein said calculation control means comprises a plurality of control registers each corresponding to one of the stages, each of the plurality of control registers connected in series to each other by the pipe-line method, and each of the plurality of control register sequentially outputting the control signal to each of the gather logic units in the corresponding stage.

6. A parallel computer system as claimed in claim 5, wherein the calculation control signal is one of an AND calculation signal, an OR calculation signal, and a MAX/MIN calculation signal.

7. A parallel computer system as claimed in claim 5, wherein each of said gathering logic units comprises:

an OR calculation means for performing a logic OR calculation on the output data from each of the processor elements;

an AND calculation means for performing a logic AND calculation on the output data from each of the processor elements;

a MAX/MIN/ADD calculation means for obtaining one of a maximum value, a minimum value and an added value of the output data from each of the processor elements; and selector means for selecting one of said OR calculation means, AND calcluations in response to the calculation and for performing calculations in response to the calculation control signal.

* * * * *

UNITED STATES PATENT AND TRADEMARK OFFICE
CERTIFICATE OF CORRECTION

PATENT NO. : 5,230,057
DATED : July 20, 1993
INVENTOR(S) : Tatsuya SHIDO et al.

It is certified that error appears in the above-identified patent and that said Letters Patent is hereby corrected as shown below:

Col. 1,    line 20, delete "with";

line 50, delete "problems several" and insert --are several problems--;

line 56, after "the" insert --processor elements to be connected to--; and line 57, change "countermeausre" to --countermeasure--.

Col. 7,    line 51, delete "from".

Col. 14,   line 17, after "elements" insert --,--.

Signed and Sealed this

Twenty-first Day of February, 1995

Attest:

BRUCE LEHMAN

Attesting Officer        Commissioner of Patents and Trademarks